(12) United States Patent
Poopalarajah et al.

(10) Patent No.: US 12,337,983 B1
(45) Date of Patent: Jun. 24, 2025

(54) SYSTEMS AND METHODS FOR THERMAL MANAGEMENT OF HIGH VOLTAGE WIRING IN AN AIRCRAFT

(71) Applicant: Archer Aviation Inc., San Jose, CA (US)

(72) Inventors: Saienath Poopalarajah, San Jose, CA (US); Paul Frihauf, San Jose, CA (US); Geoffrey Christien Bower, Sunnyvale, CA (US)

(73) Assignee: ARCHER AVIATION INC., San Jose, CA (US)

( * ) Notice: Subject to any disclaimer, the term of this patent is extended or adjusted under 35 U.S.C. 154(b) by 0 days.

(21) Appl. No.: 18/886,910

(22) Filed: Sep. 16, 2024

(51) Int. Cl.
B64D 31/16 (2024.01)

(52) U.S. Cl.
CPC .................................... B64D 31/16 (2024.01)

(58) Field of Classification Search
CPC ...................................................... B64D 31/16
See application file for complete search history.

(56) References Cited

U.S. PATENT DOCUMENTS

| | | | | |
|---|---|---|---|---|
| 6,106,966 A * | 8/2000 | Crow | ...................... | C25B 9/70 |
| | | | | 429/513 |
| 6,314,790 B1 * | 11/2001 | Sagisaka | ............. | F02D 41/1455 |
| | | | | 73/23.31 |
| 7,145,759 B2 | 12/2006 | Francis | | |
| 7,508,642 B2 | 3/2009 | Ye | | |
| 7,706,116 B2 | 4/2010 | Liu et al. | | |
| 9,784,638 B1 * | 10/2017 | Followell | ............... | B64D 13/00 |
| 10,027,317 B2 | 7/2018 | Handy | | |
| 2004/0124808 A1 * | 7/2004 | Hirono | .................... | H02P 27/08 |
| | | | | 318/806 |
| 2018/0003656 A1 * | 1/2018 | Michini | .................. | G01N 25/72 |
| 2020/0225684 A1 * | 7/2020 | Anderson | ............. | B64U 70/95 |
| 2020/0290742 A1 * | 9/2020 | Kumar | .................. | B64D 35/024 |
| 2023/0249520 A1 * | 8/2023 | Turudic | ............. | B60H 1/00385 |
| | | | | 165/201 |

OTHER PUBLICATIONS

S.L. Rickman et al., "Heat Transfer Analysis in Wire Bundles for Aerospace Vehicles", WIT Transactions on Engineering Sciences 106, Sep. 28, 2016, 53-63.

* cited by examiner

Primary Examiner — Donald J Wallace
Assistant Examiner — Jalal C Coduroglu
(74) Attorney, Agent, or Firm — Finnegan, Henderson, Farabow, Garrett & Dunner, LLP

(57) ABSTRACT

The present disclosure relates generally to controlling an aircraft to avoid overheating components. In one embodiment, a method is disclosed, comprising: receiving first sensor data indicating at least one attribute of high voltage wiring of the aircraft; receiving a state of operation of the aircraft; determining a proximity of a temperature of the high voltage wiring to a temperature limit based on the first sensor data and the state of operation of the aircraft; and controlling at least one electric propulsion unit of the aircraft to avoid exceeding the temperature limit based on the determined proximity.

25 Claims, 13 Drawing Sheets

Figure 1:
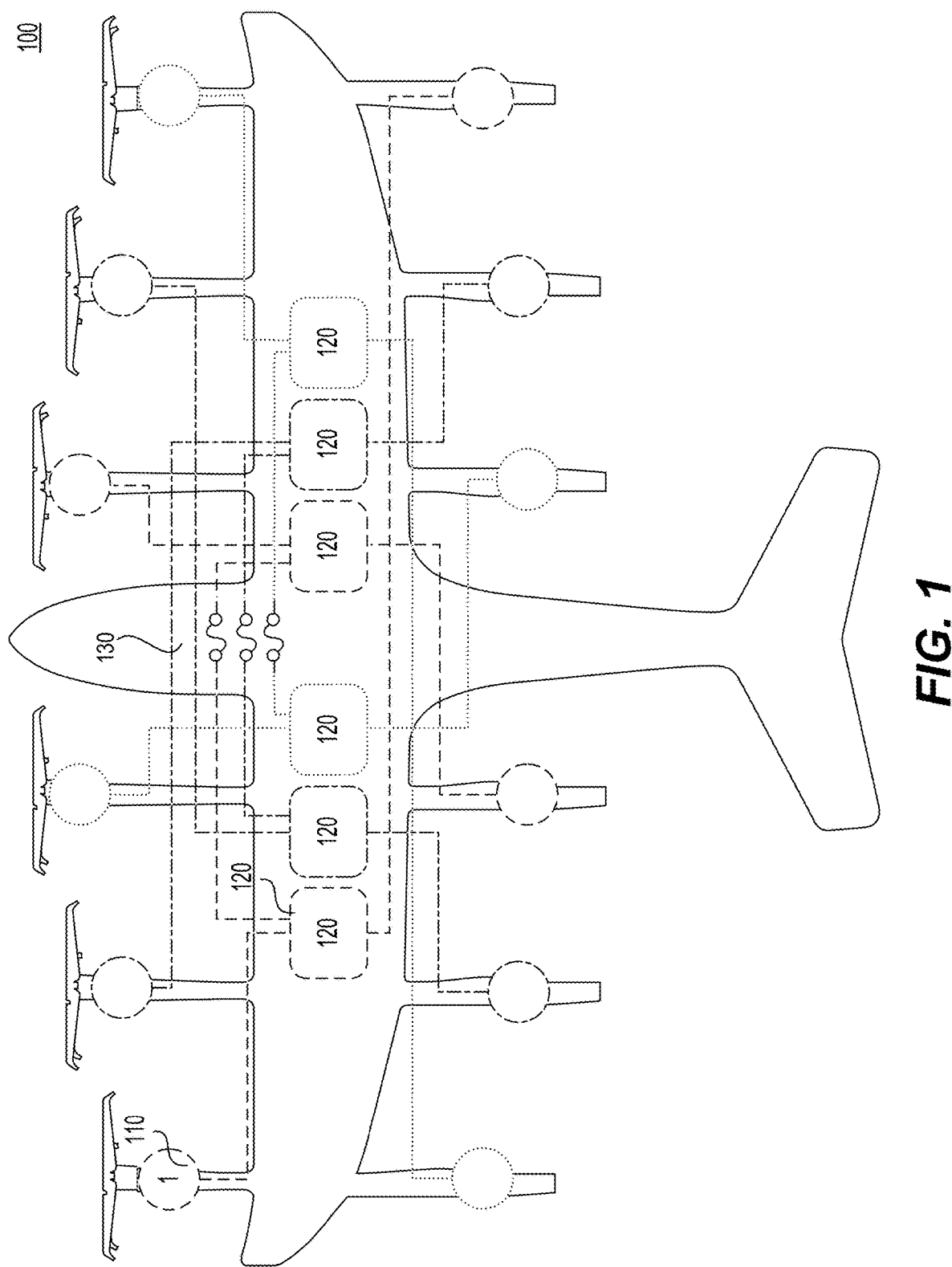

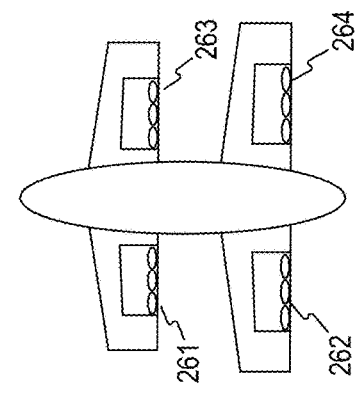
FIG. 2C
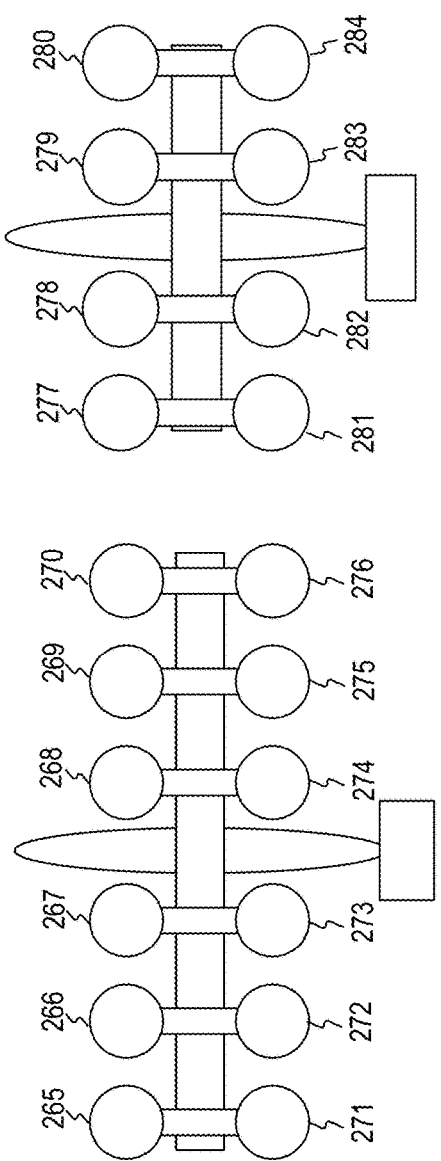
FIG. 2B
FIG. 2A
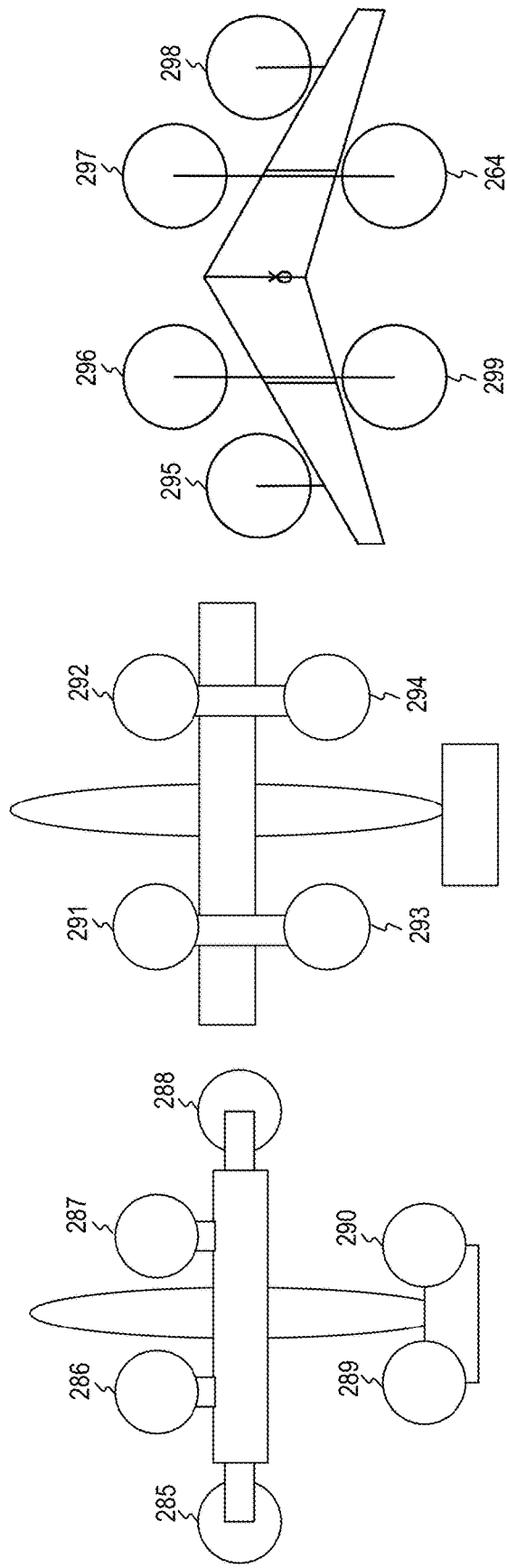
FIG. 2F
FIG. 2E
FIG. 2D

SYSTEMS AND METHODS FOR THERMAL MANAGEMENT OF HIGH VOLTAGE WIRING IN AN AIRCRAFT

TECHNICAL FIELD

This disclosure relates generally to the field of powered aerial vehicles. More particularly, and without limitation, the present disclosure relates to innovations in aircraft that use electrical propulsion systems. Certain aspects of the present disclosure generally relate to monitoring the temperature of high voltage electrical wiring and controlling an aircraft to avoid overheating the high voltage wiring.

BACKGROUND

The present disclosure relates generally to avoiding overheating the high voltage wiring of an aircraft. The high voltage wiring temperature increases with an increase in current and may exceed a safe operation temperature if high current is maintained, risking wire melting and/or presenting a fire risk. Such events can be disruptive, if not detrimental, to a variety of systems, including electrical systems of aircraft.

SUMMARY

The present disclosure relates generally to monitoring the temperature of high voltage wiring and controlling an aircraft to avoid overheating the high voltage wiring. The inventors here have recognized several problems that may be associated with powering an aircraft, including an aircraft that uses electric or hybrid-electric propulsion units (hereinafter referred to as electric propulsion units or "EPUs"). For example, depending on power demands of an aircraft, which can vary based on an aircraft state of operation (e.g., hover, takeoff, winged-flight, emergency backup power), the current in the high voltage wiring may vary greatly. The high voltage wiring temperature increases with an increase in current and may exceed a safe operation temperature if high current is maintained, risking wire melting and/or presenting a fire risk. Further, increasing the diameter of the high voltage wiring to avoid overheating in any flight situation adds weight to the aircraft, reducing flight range and cargo capacity. Therefore, there is a need for techniques that avoid overheating the high voltage wiring without significantly changing the size of the high voltage wiring.

One aspect of the present disclosure is directed to a method, comprising: receiving first sensor data indicating at least one attribute of high voltage wiring of the aircraft; receiving a state of operation of the aircraft; determining a proximity of a temperature of the high voltage wiring to a temperature limit based on the first sensor data and the state of operation of the aircraft; and controlling at least one electric propulsion unit of the aircraft to avoid exceeding the temperature limit based on the determined proximity.

Another aspect of the present disclosure is directed to a system comprising comprising at least one processor configured to execute instructions to cause the system to: receive a state of operation of the aircraft; determine a proximity of a temperature of the high voltage wiring to a temperature limit based on the first sensor data and the state of operation of the aircraft; and control at least one electric propulsion unit of the aircraft to avoid exceeding the temperature limit based on the determined proximity.

Another aspect of the present disclosure is directed to a computer-readable storage medium storing instructions which, when executed by at least one processor, cause the at least one processor to: receive a state of operation of the aircraft; determine a proximity of a temperature of the high voltage wiring to a temperature limit based on the first sensor data and the state of operation of the aircraft; and control at least one electric propulsion unit of the aircraft to avoid exceeding the temperature limit based on the determined proximity.

Yet another aspect of the present disclosure is directed to an aircraft, comprising: a first sensor; at least one electric propulsion unit; high voltage wiring, and at least one processor configured to execute instructions to: receive sensor data from the first sensor indicating at least one attribute of the high voltage wiring; receive a state of operation of the aircraft; determine a proximity of a temperature of the high voltage wiring to a temperature limit based on the first sensor data and the state of operation of the aircraft; and control the at least one electric propulsion unit of the aircraft to avoid exceeding the temperature limit based on the determined proximity.

BRIEF DESCRIPTIONS OF FIGURES

FIG. 1 illustrates an example electric aircraft, consistent with disclosed embodiments.

FIGS. 2A, 2B, 2C, 2D, 2E, and 2F illustrate exemplary top plan views of aircraft, consistent with the disclosed embodiments.

Figure 3:
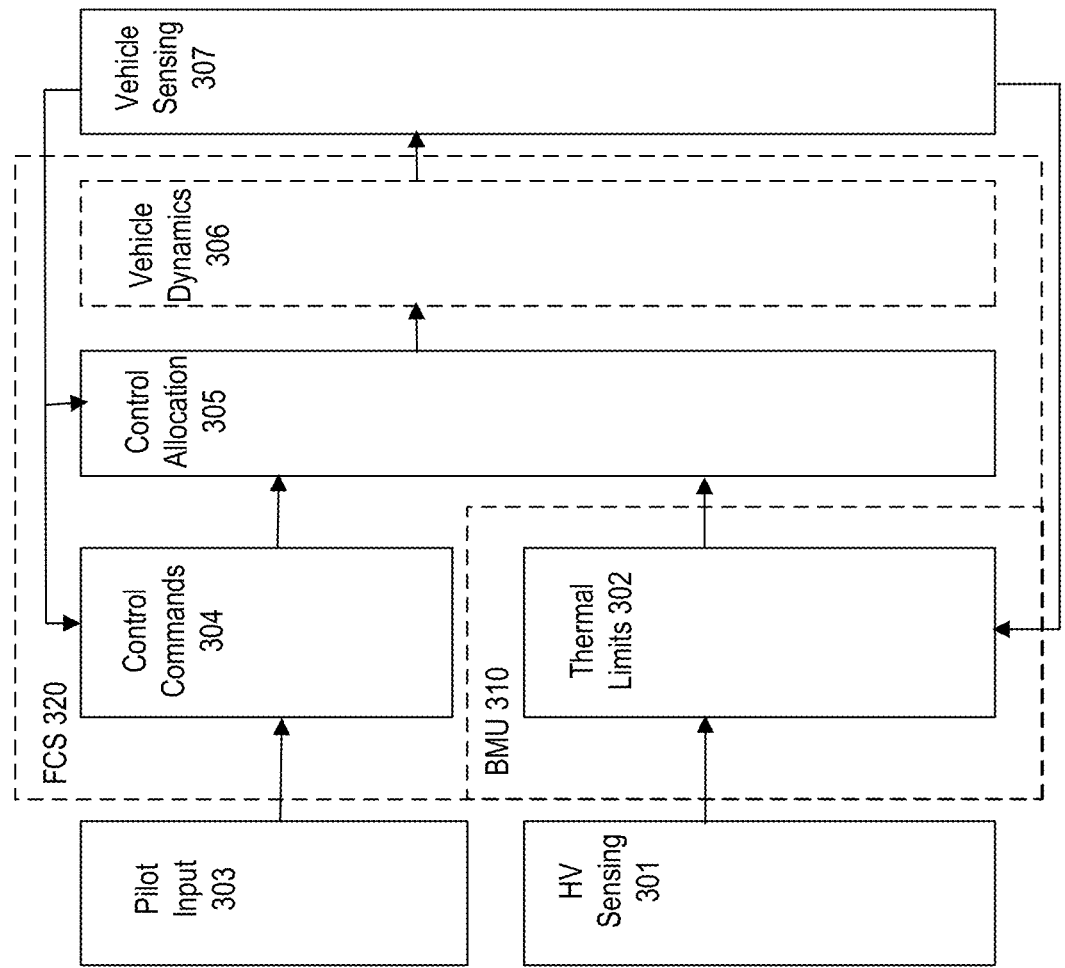

FIG. 3 illustrates a diagram for aircraft control, consistent with the disclosed embodiments.

FIGS. 4A, 4B, 4C, 4D, and 4E illustrate different models for controlling the aircraft to avoid overheating high voltage wiring, consistent with disclosed embodiments.

FIGS. 5A, 5B, 5C, and 5D illustrates how limits to avoid overheating may vary based on a flight phase of the aircraft, consistent with disclosed embodiments.

Figure 6:
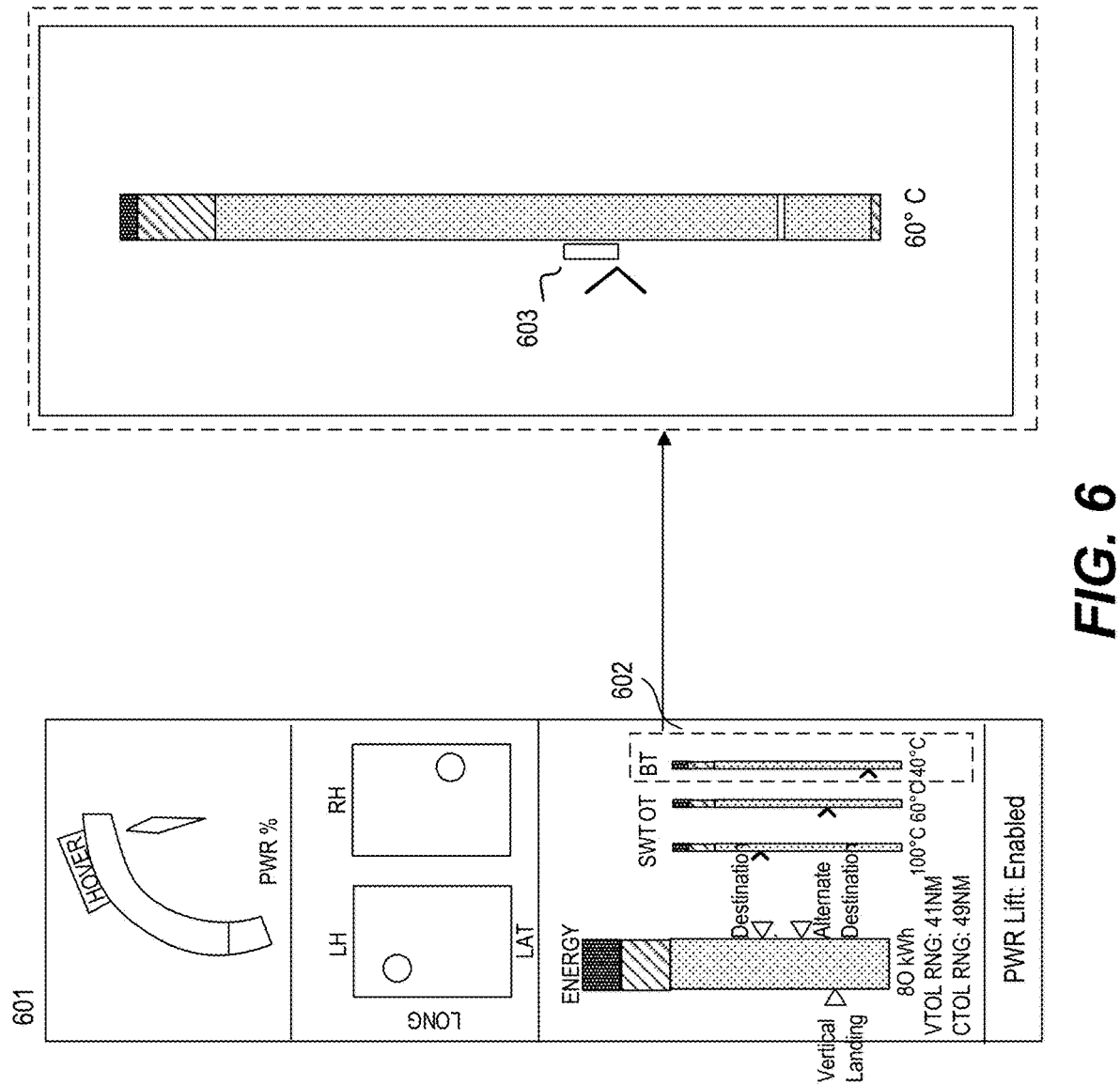

FIG. 6 illustrates a display screen indicating a status of aircraft components, consistent with disclosed embodiments.

DETAILED DESCRIPTION

The present disclosure addresses a system to avoid high voltage wiring overhearing for an electric or hybrid-electric aircraft. The aircraft may be an aircraft with a pilot, an aircraft without a pilot (e.g., a UAV), a drone, a helicopter, and/or an airplane. An aircraft includes a physical body and one or more components (e.g., a wing, a tail, a propeller) configured to allow the aircraft to fly. In some embodiments, the aircraft is driven by one or more electric propulsion units (hereinafter referred to as electric propulsion units or "EPUs"), which may include at least one engine, at least one rotor, at least one propeller, or any combination thereof. The EPUs may be powered by an electric energy source (e.g., a battery pack). High voltage wiring may run from the aircraft energy source (e.g., battery packs) to the electric propulsion units. The high voltage wiring is critical to ensure thrust may be provided by the aircraft's electric propulsion units to maintain stability and controllability of the aircraft.

To ensure the integrity of an aircraft's high voltage wiring, one solution is to oversize the high voltage wiring to ensure the wiring can maintain any expected current rate indefinitely without overheating. However, oversizing electric wiring adds weight to the aircraft, hindering performance and increasing energy consumption. Another solution is to monitor the state of temperature of wiring and simply disconnect a circuit that is overheating. However, this solution may not be ideal if the circuitry is powering critical aircraft components (e.g., electric propulsion units, other battery packs etc.).

The disclosed embodiments address these problems, and others, by monitoring high voltage wiring temperatures, adjusting one or more battery pack states based on the high voltage wiring temperature associated with (e.g., fed by) the respective battery pack, and/or controlling the electric propulsion units of the aircraft based on the adjusted battery pack states. For example, a battery pack's state of power may be de-rated based on an increase in high voltage wiring temperature associated with the battery pack and the aircraft may be controlled to reduce usage of electric propulsion unit(s) powered by the battery pack. Therefore, current through the high voltage wiring will be reduced to avoid the wiring overheating.

Further, the disclosed embodiments may predict an amount of time until the high voltage wiring reaches a temperature limit and adjust the battery state based on the predicted time. The predicted time until the temperature limit is reached may consider one or more existing or upcoming phases of flight of the aircraft. Therefore, electric propulsion units may be controlled to avoid high voltage wiring overheating even when the current draw varies based on phase(s) of flight.

FIG. 1 illustrates an example electric aircraft, consistent with disclosed embodiments. As shown in FIG. 1, in some embodiments, the distributed electrical propulsion system of the eVTOL aircraft 100 may include twelve electric propulsion units (e.g., electric engines, fans, turbines etc.), which may be mounted on booms forward and aft of the main wings of the aircraft 100. The forward electric propulsion units may be tiltable (e.g., during flight) between a horizontally oriented position (e.g., to generate forward thrust) and a vertically oriented position (e.g., to generate vertical thrust). The forward electric propulsion units may be of a clockwise type or counterclockwise type in terms of direction of propeller rotation. The aft electric propulsion units may be fixed in a vertically oriented position (e.g., to generate vertical thrust), and may also be of a clockwise type or counterclockwise type in terms of direction of propeller rotation. As used herein, the term "eVTOL" or "electric aircraft" may refer to an aircraft that uses at least one electric-based energy source and may include fully electric aircraft as well as hybrid aircraft that uses electricity in addition to another fuel source.

The aircraft 100 may possess various combinations of forward and aft electric propulsion units. For example, in some embodiments, the aircraft 100 may possess six forward electric propulsion units 110 and six aft electric propulsion units 110. In some other embodiments, the aircraft 100 may include four forward electric propulsion units and four aft electric propulsion units, or any other combination of forward and aft electric propulsion units 110. In some other embodiments, the number of forward electric engines and aft electric engines are not equivalent. FIG. 2 details different example configurations of electric propulsion units 110.

In some embodiments, for a vertical takeoff and landing (VTOL) mission, the forward electric propulsion units as well as aft electric propulsion units may provide vertical thrust during takeoff and landing. During flight phases where the aircraft 100 is in forward flight, the forward electric propulsion units may provide forward thrust (e.g., in a horizontal direction), while the propellers of the aft electric propulsion units may be stowed at a fixed position (e.g., with their propeller blades orientated parallel or near parallel to a front-back axis of the aircraft) in order to minimize drag. The aft electric propulsion units may be actively stowed with position monitoring.

In some embodiments, in a conventional takeoff and landing (CTOL) mission, the forward electric propulsion units may provide forward thrust for wing-borne take-off, cruise, and landing. In some embodiments, the aft electric propulsion units may not be used for generating thrust during a CTOL mission and the aft propellers may be stowed in place.

Transition from vertical flight to forward flight and vice-versa may be accomplished via the tilt propeller subsystem. The tilt propeller subsystem may redirect thrust between a primarily vertical direction during vertical flight phase to a mostly horizontal direction during forward-flight phase. A variable pitch mechanism may change the forward electric engine's propeller-hub assembly blade collective angles for operation during the hover-phase, transition phase, and cruise-phase.

As shown in FIG. 1, a high voltage power system (HVPS) of the aircraft 100 may include a power source, such as battery packs 120, which supply high voltage power to be converted into, among other possible uses, mechanical shaft power to rotate propellers of the electric propulsion units 110. The amount of thrust each electric propulsion unit 110 generates may be governed by a torque command from the Flight Control System (FCS) over a digital communication interface to each electric propulsion unit 110.

In some embodiments, the aircraft includes six battery packs 120, which may be installed within the battery bays in the wing of the aircraft 100. In some embodiments, six battery packs 120 may have an identical design to simplify design, manufacturing, and logistics. The battery packs 120 may power one or more electric propulsion units 110. While six battery packs 120 are shown, the aircraft 100 may have any number of battery packs 120.

In some embodiments, a single battery pack 120 may be electrically connected to, and power, multiple electric propulsion units. For example, in some embodiments, a battery pack 120 may power an electric propulsion unit 110 on either side of a longitudinal axis running through the center of the aircraft. In some embodiments a battery pack 120 may power an electric propulsion unit 110 on either side of a horizontal axis running through the wing. In some embodiments, as shown in FIG. 1, a battery pack 120 may power two diagonally opposing electric propulsion units. Therefore, upon a loss of a battery pack 120, the impact to roll or pitch moments can be reduced because the loss of lift is balanced. In some embodiments, battery packs 120 may power different arrangements of electric propulsion units to reduce roll, pitch, or yaw moments that may be caused by a loss of the battery pack 120. For example, in some embodiments, battery packs 120 may be connected to electric propulsion units in any manner that balances lift and/or forward thrust across the longitudinal and horizontal axis of the aircraft.

Further, the exemplary HVPS system includes a cross-link 130 possessing at least one fuse allowing for pairing of two or more battery packs 120. Through the cross-link, power for the electric propulsion units can be shared among the paired battery packs 120. While in the example of FIG. 1 battery packs 120 are connected in pairs using three separate cross-links 130, it is appreciated that any number of battery packs may be connected using cross-links (e.g., pairs, triplets, quadruplets, or a combination thereof) and/or that some or even all batteries may not be connected using any cross-link. Therefore, multiple battery packs 120 can simultaneously power multiple electric propulsion units. This arrangement provides for redundancy and avoids a single point of failure because each paired battery 120 may act as a backup for the other(s). Upon failure of a battery pack 120, one or more connected battery packs 120 may continue powering the failed battery pack's connected electric propulsion units.

The above aircraft and battery pack configurations are provided as examples, but the aircraft may include a different configuration of electric propulsion units (e.g., as shown below with reference to FIGS. 2A-2F), battery packs, battery pack connections, and battery pack cross link combinations. In some embodiments, each battery pack may power an individual electric propulsion unit (e.g., electric engine). For example, an aircraft may have four, six, eight, ten, twelve, or any number of electric propulsion units and the number of battery packs may match the number of electric propulsion units. In some embodiments, each battery pack may power only one electric propulsion unit and may be electrically separate from all other battery packs. In some embodiments, each battery pack may power one or more partial motors and each electric propulsion unit (e.g., electric engine) may include two or more partial motors. A partial motor may include a motor that can independently drive a component that can also be driven independently by at least one other motor. Partial motors may be driven by separate motor controllers. Therefore, each electric propulsion unit may have a backup power source, but the battery packs may still be electrically separate.

In some embodiments, each battery pack may power multiple electric propulsion units. As described above, battery packs may power sets of electric propulsion units that are symmetrical across one or more axes of symmetry. In some embodiments, a battery pack may power electric propulsion units (e.g., electric engines) that are symmetrical across an aircraft's longitudinal axis, lateral axis, or both. For example, as described above, in some embodiments, different battery packs may power diagonally symmetric electric propulsion units (e.g., electric engines).

In some embodiments, a battery pack may power more than two electric propulsion units. In some embodiments, a battery pack 120 may power two or more sets of diagonally symmetric electric propulsion units. In some embodiments, the set of electric propulsion units powered by a battery pack may include an inboard diagonally symmetric pair of electric propulsion units and an outboard diagonally symmetric pair of electric propulsion units (e.g., electric engines). In some embodiments, a battery pack may power four or more electric propulsion units in a configuration that is symmetrical across the longitudinal axis of symmetry.

In some embodiments, some or all of the battery packs are interconnected. As described above, a cross-link may allow each battery pack to act as backup power for another. For example, in some embodiments, a first battery pack may directly power a first number electric propulsion units (e.g., electric engines) and a second battery pack may directly power a second number of electric propulsion units (e.g., electric engines). The first and second battery packs may be cross-linked together to form a battery pack unit. Therefore, each battery pack in the unit may act as a backup for the other. Upon failure of a battery pack in the unit, the failing battery pack may be disconnected and electric propulsion units (e.g., electric engines) will be powered by one or more non-failing battery packs in the unit. The battery packs in a battery pack unit may be electrically separate from other battery pack units.

In some embodiments, a battery pack unit may comprise three battery packs, wherein each battery pack powers a number of electric propulsion units (e.g., electric engines). For example, in some embodiments, each battery pack may power two diagonally symmetric electric engines. Therefore, each battery pack unit may power a total of six electric engines and each electric engine has two battery pack backups. In some embodiments, each battery pack in the battery pack unit may power four electric engines, comprising two sets of diagonally symmetric electric engines. Therefore, each battery pack unit may power a total of twelve electric engines and each electric engine has two battery pack backups.

In some embodiments, a battery pack unit may comprise four battery packs, wherein each battery pack powers a number of electric propulsion units (e.g., electric engines). For example, in some embodiments, each battery pack may power two diagonally symmetric electric propulsion units. Therefore, each battery pack unit may power a total of eight electric propulsion units and each electric propulsion unit has three battery pack backups. In other embodiments, each battery pack in the battery pack unit may power four electric propulsion units, comprising two sets of diagonally symmetric electric propulsion units. Therefore, each battery pack unit may power sixteen electric propulsion units and each electric propulsion unit has three battery pack backups.

In some embodiments, all battery packs are connected to a common bus. In some embodiments, the common bus may form a circular power supply, providing for additional redundancy in connections, while in other embodiments the common bus may not form a circular power supply.

In some embodiments, electric propulsion units comprise a single motor that is powered by the one or more battery packs. In some embodiments, each electric propulsion unit may include two or more partial motors and the battery packs may power partial motors. In some embodiments, any of the electric propulsion unit powering configurations described above may include powering partial motor(s) of battery pack(s).

Different configurations of battery packs, electric propulsion units (e.g., electric engines), battery pack to electric propulsion unit connections, and battery pack cross link combinations may be chosen to best balance aircraft power needs, system redundancy, and fault tolerance.

Based on the configuration of battery packs, electric propulsion units (e.g., electric engines), battery pack to electric propulsion unit connections, and battery pack cross link combinations, the high voltage wiring associated with each battery pack may vary. In some embodiments, a temperature of high voltage wiring may be associated with any connected battery pack feeding the high voltage wiring (e.g., any battery pack the HV wiring is sourcing current from). Therefore, the battery pack state of the battery pack feeding the high voltage wiring may be appropriately adjusted based on the high voltage wiring temperature.

Further, based on the configuration, the electric propulsion units controlled according to the battery state may vary. In some embodiments, each electric propulsion unit fed by a battery pack (e.g., each EPU drawing power from a battery pack) may be controlled according to a state of the battery pack. For example, if the battery pack state is reduced, the aircraft may be controlled to reduce a thrust provided by all the electric propulsion units sourcing power from that battery pack.

FIGS. 2A, 2B, 2C, 2D, 2E, and 2F illustrate exemplary top plan views of aircraft, consistent with the disclosed embodiments.

FIGS. 2A-2F are illustrations of a top plan view of exemplary aircrafts, consistent with the disclosed embodiments. There may be a number of design considerations (cost, weight, size, performance capability etc.) that may influence the number and/or combination of tilt and lift propellers in an aircraft. The number and orientation of propellers may affect the number of battery packs and connections between battery packs (e.g., to achieve controllability and/or stability upon electric failure).

FIG. 2A illustrates an arrangement of electric propulsion units, consistent with the disclosed embodiments. Referring to FIG. 2A, the aircraft shown in the figure may be a top plan view of an exemplary aircraft. The aircraft may include twelve electric propulsion units distributed across the aircraft. In some embodiments, a distribution of electric propulsion units may include six forward electric propulsion units (265, 266, 267, 268, 269, and 270) and six aft electric propulsion units (271, 272, 273, 274, 275, and, 276). In some embodiments, the six forward electric propulsion units may be operatively connected to tilt propellers and the six aft electric propulsion units may be operatively connected to lift propellers. In other embodiments, the six forward electric propulsion units and a number of aft electric propulsion units may be operatively connected to tilt propellers and the remaining aft electric propulsion units may be operatively connected to lift propellers. In other embodiments, all forward and aft electric propulsion units may be operatively coupled to tilt propellers.

FIG. 2B illustrates an alternate arrangement of electric propulsion units, consistent with the disclosed embodiments. Referring to FIG. 2B, the aircraft shown in the figure may be a top plan view of an exemplary aircraft. The aircraft may include eight electric propulsion units distributed across the aircraft. In some embodiments, a distribution of electric propulsion units may include four forward electric propulsion units (277, 278, 279, and 280) and four aft electric propulsion units (281, 282, 283, and 284). In some embodiments, the four forward electric propulsion units may be operatively connected to tilt propellers and the four aft electric propulsion units may be operatively connected to lift propellers. In other embodiments, the four forward electric propulsion units and a number of aft electric propulsion units may be operatively connected to tilt propellers and the remaining aft electric propulsion units may be operatively connected to lift propellers. In other embodiments, all forward and aft electric propulsion units may be operatively coupled to tilt propellers.

FIG. 2C illustrates an alternate arrangement of electric propulsion units, consistent with the embodiments of the present disclosure. Referring to FIG. 2C, the aircraft may be a top plan view of an exemplary aircraft. In some embodiments, the aircraft may include ducted fans operably connected to the electric propulsion units. In some embodiments the aircraft may include a bank of ducted fans on each wing of the aircraft (261, 262, 263, 264), and the bank of ducted fans may be connected to tilt together (e.g., between lift and forward thrust configuration). In some embodiments the aircraft includes a left and right front wing and a left and right rear wing. In some embodiments, each wing of the aircraft includes a bank of connected ducted fans. In some embodiments, each bank of connected ducted fans are tiltable (e.g., between lift and forward thrust), while in other embodiments only the bank of fans on the front wing(s) are tiltable.

FIG. 2D illustrates an alternate arrangement of electric propulsion units, consistent with the disclosed embodiments. Referring to FIG. 2D, the aircraft shown in the figure may be a top plan view of an exemplary aircraft. The aircraft may include six electric propulsion units distributed across the aircraft. In some embodiments, a distribution of electric propulsion units may include a first set of four electric propulsion units 285, 286, 287, and 288 coplanar in a first plane and a second set of two electric propulsion units 289 and 290 coplanar in a second plane. In some embodiments, the first set of electric propulsion units 285, 286, 287, and 288 may be operatively connected to tilt propellers and second set of electric propulsion units 289 and 290 may be operatively connected to lift propellers. In other embodiments, the first set of electric propulsion units 285, 286, 287, and 288 and the second set of aft electric propulsion units 289 and 290 may all be operatively connected to tilt propellers.

FIG. 2E illustrates an alternate arrangement of electric propulsion units, consistent with the disclosed embodiments. Referring to FIG. 2E, the aircraft shown in the figure may be a top plan view of an exemplary aircraft. The aircraft may include four electric propulsion units distributed across the aircraft. In some embodiments, a distribution of electric propulsion units may include four coplanar electric propulsion units 291, 292, 293, and 294. In some embodiments, all of the electric propulsion units may be operatively connected to tilt propellers.

FIG. 2F illustrates an alternate arrangement of electric propulsion units, consistent with the disclosed embodiments. Referring to FIG. 2F, the aircraft shown in the figure may be a top plan view of an exemplary aircraft (e.g., a VTOL aircraft). The aircraft may include six electric propulsion units distributed across the aircraft. For example, in some embodiments, the aircraft may include four forward electric propulsion units 295, 296, 297, and 298 operatively connected to tilt propellers and the two aft electric propulsion units 299 and 264 operatively connected to lift propellers. In some embodiments, the aircraft may include ten electric propulsion units distributed across the aircraft. For example, in some embodiments, the aircraft may include six forward electric propulsion units operatively connected to tilt propellers and the four aft electric propulsion units operatively connected to lift propellers. In some embodiments, some or all of the aft electric propulsion units may operatively connected to tilt propellers.

As shown in FIG. 2F, in some embodiments, the aircraft may have a flying wing configuration, such as a tailless fixed-wing aircraft with no definite fuselage. In some embodiments, the aircraft may have a flying wing configuration with the fuselage integrated into the wing. In some embodiments, the tilt propellers may rotate in a plane above the body of the aircraft when the tilt propellers operate in a lift configuration.

FIG. 3 illustrates a diagram for aircraft control, consistent with the disclosed embodiments. Flight Control System (FCS) 320 and Battery Management Unit (BMU) 310 may be implemented by at least one processor (e.g., at least one microprocessor-based controller) configured to execute software code stored in a storage medium (e.g., a computer-readable medium, a non-transitory computer-readable medium) to implement any combination of the functions described herein. FCS 320 and BMU 310 may also be implemented in hardware, or a combination of hardware and software and may be configured to perform a single step or sequence repeatedly until a desired or commanded outcome is achieved.

Pilot Input 303 represents input from a pilot input device indicating a commanded aircraft state. The pilot input device is configured to receive pilot input and generate or influence a signal. The pilot input device may include a button, a switch, a knob, a stick, a slider, an inceptor, any combination thereof, or any other device configured to generate or influence a signal based on a physical action from a pilot. For example, a pilot input device may include one or more of right inceptor(s) (e.g., moving right inceptor left/right and/or right inceptor forward/aft), left inceptor(s) (e.g., moving left inceptor left/right and/or left inceptor forward/aft), and/or an inceptor switch. In some embodiments, a pilot input device may include an interface with an autopilot system (e.g., display screen(s), switch(es), button(s), lever(s), and/or other interface(s)). Pilot Input 303 may also represent input directly from an autopilot system, such as a roll command, climb command, and/or other command(s) to control the aircraft.

Control commands 304 represent one or more executed processes to provide commands (e.g., moment commands to control allocation 305) to control the aircraft. The processes may include modeling a commanded aircraft response (e.g., determining a shape of an ideal aircraft response), feedback and feedforward processes (e.g., determining corresponding forces to accomplish a desired change in the aircraft), outer loop processes (e.g., determining a corresponding yaw, roll, command, pitch, and/or thrust), and/or one or more inner loop control law processes (e.g., determining moment commands). Each of these processes may involve one or more control laws, rules, functions, models, and/or algorithms (e.g., stored in a memory) and may dynamically adjust their outputs based on inputs (e.g., from pilot input 303, vehicle sensing 307, BMU 310, and/or Thermal Limits 302).

Control allocation 305 may control the aircraft's flight elements based on input from control commands 304, thermal limits 302, BMU 310, and/or vehicle sensing 307. For example, control allocation 305 may control (e.g., transmit one or more commands to) one or more electric propulsion units of the aircraft (e.g., electric engines, propellers, actuators, rotors, etc.). Control allocation 305 may further control one or more control surface(s) of the aircraft, including flaperon(s), ruddervator(s), aileron(s), spoiler(s), rudder(s), and/or elevator(s).

Control allocation 305 may include one or more models or functions (e.g., an optimizer function) to control commands to electric propulsion units and/or control surfaces that meet a commanded aircraft state while also meeting one or more hard and/or soft constraints. For example, control allocation 305 may weight different priorities such as maintaining a lift and/or forward thrust (e.g., for aircraft stability or controllability), meeting a battery requirement (e.g., a de-rated battery state), meeting engine thermal requirements (e.g., established by thermal limits 302), and/or avoiding propeller speeds corresponding with vibration over a threshold etc. In some embodiments, control allocation 305 may determine multiple control solutions to meet the commanded aircraft state and select the solution that best meets the priorities (e.g., according to relative weights between the priorities). Vehicle dynamics 306 represents the controlled flight elements (e.g., electric propulsion system(s) and/or control surfaces) and aircraft dynamics (e.g., how the aircraft responds to flight element control (aircraft orientation, movement etc.)).

Vehicle sensing 307 may detect vehicle dynamics, aircraft state, and/or a flight phase of the aircraft. Vehicle sensing 307 may include one or more sensors configured to detect vehicle dynamics and/or an aircraft state, such as acceleration and/or pitch orientation sensors (e.g., accelerometer(s), 3-axis accelerometer(s), gyroscope(s), and/or 3-axis gyroscope(s)), airspeed sensors (e.g., pitot tube sensors), and/or ground speed sensors. Vehicle sensing 307 may further include one or more inertial measurement units (IMUs) to determine an aircraft state. An aircraft state may include at least one of: a position of the aircraft (e.g., a yaw angle, roll angle, pitch angle, and/or any other orientation across one or two axes), velocity of the aircraft, angular rate of the aircraft (e.g., roll, pitch, and/or yaw rate), and/or an acceleration of the aircraft (e.g., longitudinal, lateral and/or vertical acceleration), or any physical characteristic of the aircraft or one of its components.

Vehicle sensing 307 may include one or more sensors to detect a flight phase of the aircraft. For example, Vehicle Sensing 307 may include an air data system and/or airspeed sensors (e.g., pitot tubes), groundspeed sensors, gps sensors, propeller speed sensors (e.g., hall effect sensors and/or optical sensors), propeller tilt angle sensors, (e.g., magnetic sensors, position displacement sensors, linear displacement sensors etc. to measure a nacelle tilt angle), accelerometers, and/or gyroscopes to determine a flight phase. In some embodiments, a flight phase may be determined based on comparing one or more of these sensor measurements to pre-stored thresholds. For example, vehicle sensing 307 may determine a flight phase based on airspeed measurements (and/or groundspeed measurements) and/or propeller tilt angle measurements. For example, a higher airspeed and tilt angle in a forward thrust configuration may correspond to a forward flight phase and a lower airspeed and tilt angle in a lift configuration may correspond to a hover and/or takeoff flight phase. A "phase of flight" or "flight phase" (e.g., hover, cruise, forward flight, takeoff, landing, transition) may be defined by a combination flight conditions (e.g., a combination of flight conditions within particular ranges), which may include one or more of an airspeed, altitude, pitch angle (e.g., of the aircraft), tilt angle (e.g., of one or more propellers), roll angle, rotation speed (e.g., of a propeller), torque value, pilot command, or any other value indicating a current or requested (e.g., commanded) state of at least part of the aircraft. Flight phases may include one or more of: vertical takeoff, short takeoff, hover, forward flight, winged-borne flight, vertical descent, conventional landing, and/or any other flight movements that impact a current draw of the electric propulsion units.

High voltage (HV) sensing 301 may detect a state of one or more components of the aircraft's high voltage power system. For example, HV sensing 301 may include one or more sensors associated with battery packs 120 to collect sensor data indicating at least one attribute (e.g., temperature of the HV wiring, wing ambient temperature, current, voltage, power, and/or frequency) of high voltage wiring of the aircraft. For example, HV sensing 301 may include one or more current sensors, voltage sensors, and/or temperature sensors, which may be associated with one or more battery packs. In some embodiments, temperature sensors may be located on a section of positive and/or negative high voltage channel feeding (configured to power) each electric propulsion unit 110 and/or on a section of high voltage wiring feeding (configured to power) another battery pack (e.g., cross links 130). In some embodiments, temperature sensors may be mounted within the aircraft wing to monitor an ambient air temperature in proximity to one or more high voltage channels (wing ambient temperature). In some embodiments, current sensors may be placed on section of positive and/or negative high voltage channel feeding (configured to power) at least one (e.g., each) electric propulsion unit and/or on a section of high voltage wiring feeding (configured to power) another battery pack (e.g., cross links 130). In some embodiments, one or more sensors may detect when a battery pack has been disconnected. For example, one or more sensors may detect a battery pack has been disconnected based on a fuse being blown, a current measurement (e.g., a current measurement of zero or decreasing below a threshold), and/or a voltage measurement (e.g., a voltage measurement of zero or decreasing below a threshold).

Thermal limits 302 include one or more processes for determining a proximity to a thermal limit (e.g., a temperature limit) imposed by high voltage wiring temperature, as further described below with respect to FIGS. 4A-4C. As described below, in some embodiments processes executed by thermal limits 302 may be executed by the FCS 320, while in other embodiments the processes executed by thermal limits 302 may be executed by BMU 310. In some embodiments, one or more steps may be performed by BMU 310 while other steps are performed by the FCS 320. In some embodiments, processes performed by thermal limits 302 may be executed by one or processors separate from the BMU 310 and FCS 320.

As detailed below, limits established by a high voltage wiring temperature may be considered separately or together with other battery limits. For example, limits imposed by a high voltage wiring temperature may be applied by de-rating a battery pack state that is considered by control commands 304 and/or control allocation 305. De-rating a battery pack state may include adjusting a descriptive value or weight associated with the battery pack, such as by adjusting a state of power, state of charge, state of health, state of energy, available current, and/or any other indicator of a capability, state, or treatment (e.g., weight within an algorithm) of a battery pack. As stated above, battery pack states (discussed further below) may include a state of power, state of health, state of energy, and/or any other battery operational information of a battery pack. Battery pack states may be determined based on one or more sensor measurements (e.g., from vehicle sensing 307 and/or HV sensing 301). For example, a battery pack state may be determined based on monitoring current, voltage, temperature (of battery pack and/or associated wiring), and/or tracking a life of the battery pack. In some embodiments, a state of charge may indicate an ability of the battery pack at a particular instant of time to store (or provide) charge. State of charge may be expressed as an absolute number (e.g., Coulombs or Amp-hrs Ah) or as a ratio or percentage relative to a maximum ability of the battery pack to store (or provide) charge. In some embodiments, a state of charge may refer to an available battery pack capacity relative to the battery pack's rated capacity. For example, the state of charge may be based on an open circuit voltage (OCV) of the battery pack, where the OCV is the resting voltage of the battery pack (e.g., based on a battery pack without current flow for a set period of time). When the battery pack has not been resting for a set period of time, a state of charge of the battery pack may be estimated using a coulomb counting and an initial state of charge (e.g., determined at rest). For example, SOC=(initial_soc+integral(current*dt))/battery capacitance. In other embodiments, other approaches may be used to determine battery pack SOC. For example, SOC may be determined using Kalman filtering which uses a model that relates SOC to battery dynamics, current, and/or voltage measurements. In some embodiments, state of energy may refer to an amount of energy available in the battery pack. For example, a state of energy may consider the health of the battery pack (e.g., life, degradation etc.) to determine an amount of energy available from the battery pack. In some embodiments, state of power may indicate an available power that can be provided by the battery pack over a time horizon e.g., without exceeding at least one system constraint (such as battery pack voltage constraint, battery cell temperature constraint, HV wiring current carrying constraint, etc.). State of power may be expressed as an absolute number (e.g., kW, W) or as a ratio or percentage relative to a maximum rated power (e.g., a maximum rated system power). Means of determining a state of power is further detailed below with respect to FIGS. 4A-4E. In some embodiments, state of health may refer to a current condition or overall health of a battery relative to its original, acceptable, preferable, or optimal state. For example, state of health may reflect an amount of impedance which adversely effects the battery pack performance and/or an charge that can be extracted from a battery. In some embodiments, state of health may indicate an ability of the battery pack at a particular instant of time to store (or provide) charge relative to a maximum original charge storage (or provision) ability of the battery pack. State of health may be expressed as a ratio or percentage relative to the maximum charge storage (or provision) ability of the battery pack.

In other embodiments, limits established by a wire temperature may be applied separately from other battery limits. For example, a proximity to a temperature limit may directly result in adjustments to power allocated by to one or more electric propulsion units. In some embodiments, in addition to controlling power draw by electric propulsion units, the BMU 310 and/or FCS 320 may provide warning to a pilot (e.g., through a pilot interface associated with the FCS 320), and/or may command certain aircraft maneuvers (e.g., an emergency landing) based on a proximity to a temperature limit. A proximity to be temperature limit may be, may include, or may be based on, a time until the temperature limit is reached.

Figure 4A:
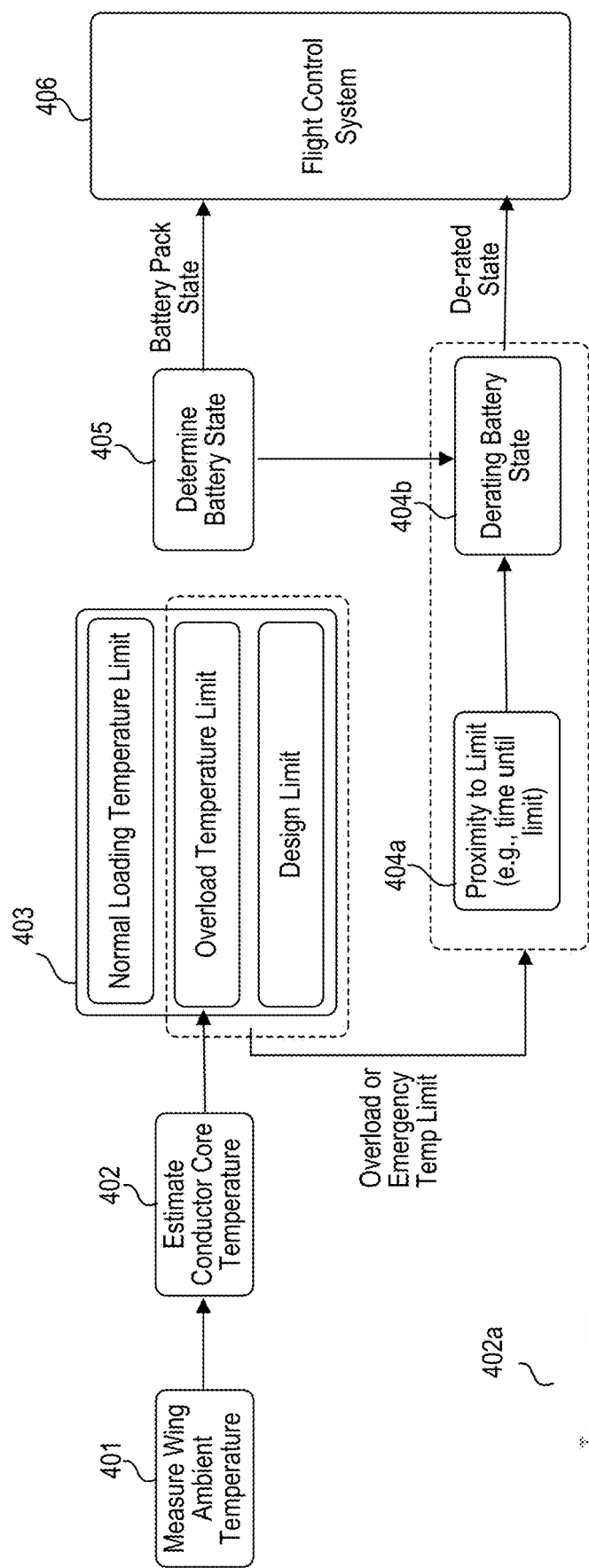
Figure 4A:
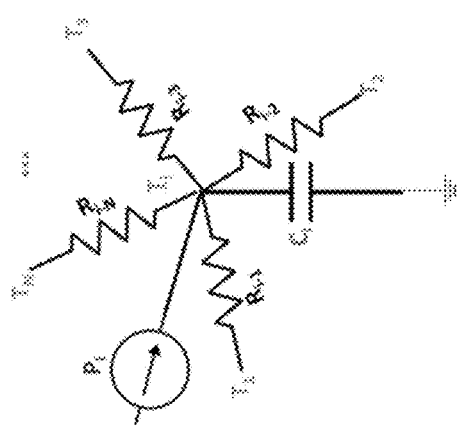
Figure 4B:
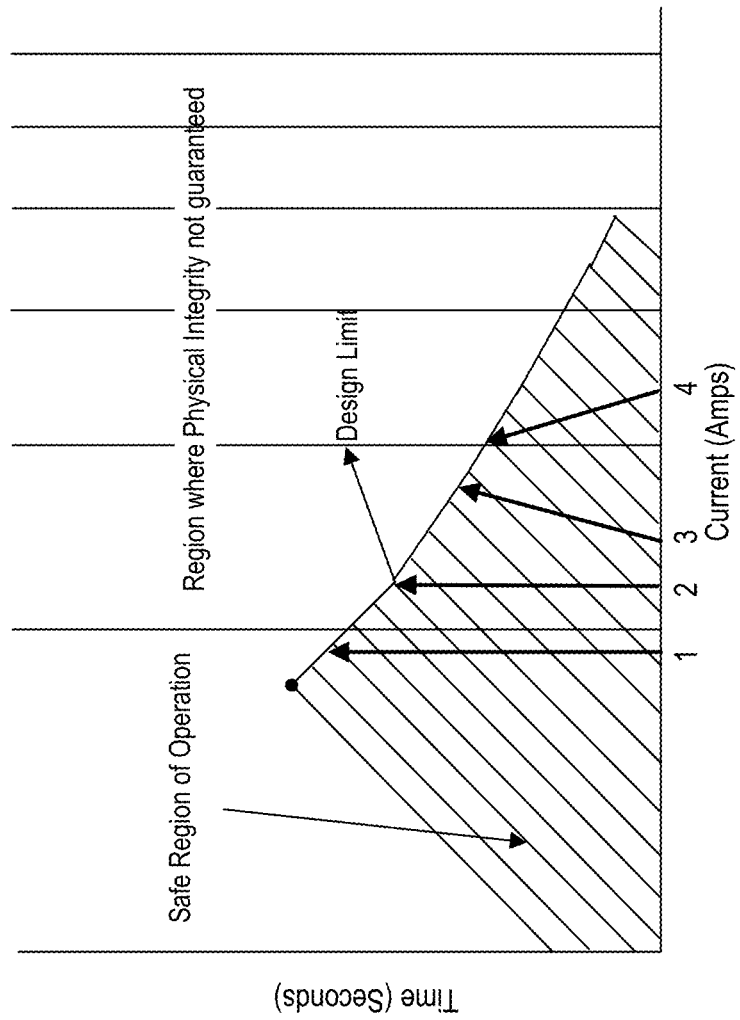
Figure 4C:
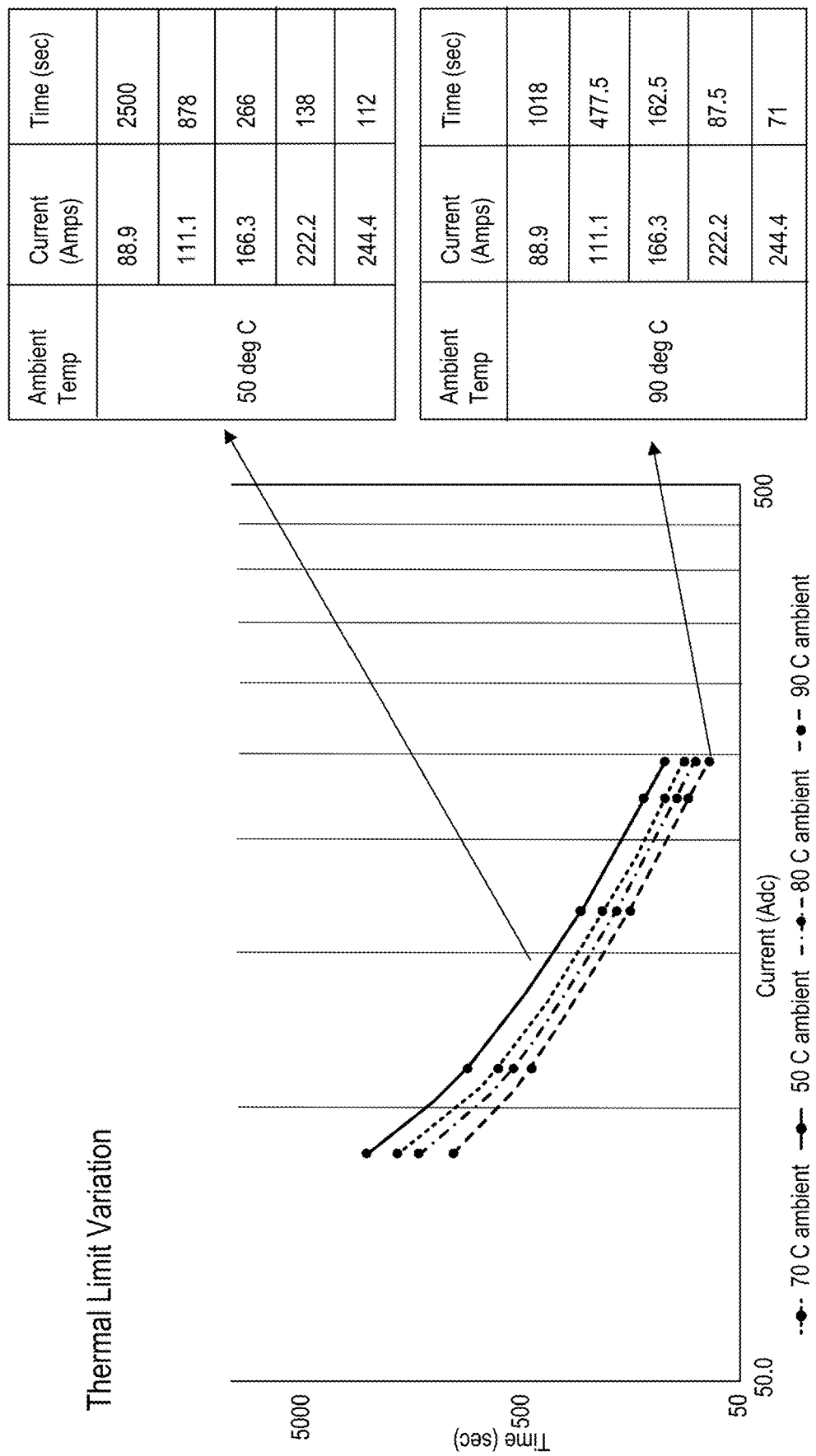

FIG. 4A illustrates a model 400 for controlling the aircraft to avoid overheating high voltage wiring, consistent with disclosed embodiments. In some embodiments, model 400 may be implemented as a process, a computer-implemented method, a computerized model, and/or a computerized algorithm or program. For sake of descriptive ease, portions of model 400 will be described as steps, but it is appreciated that they may be implemented as modules, computerized functions, programs, calculations, or any combination thereof. It is appreciated that the steps of the exemplary models depicted in FIGS. 4A, 4E, and 4D would be impossible, or at least impractical, to effectively implement by a human user, especially when considering that these functionalities are implemented frequently (e.g., constantly, continually), while the aircraft is flying (including taking off or landing), and/or dynamically based on (e.g., in response to) received signals (e.g., aircraft sensors, which may be constantly measuring various conditions, and/or pilot input devices). In general, it may be understood that any/all steps of the exemplary models of FIGS. 4A, 4E, and 4D may be performed or executed by at least one processor (e.g., a processor associated with the FCS and/or BMU), such as according to one or more instructions stored on a computer-readable medium (e.g., nontransitory computer-readable medium).

At step 401 an ambient air temperature within the aircraft wing may be determined (e.g., received, requested, measured, and/or calculated). For example, an ambient air temperature may be received from a temperature sensor in proximity (e.g., within a foot, within a few feet, meters, within the same aircraft wing) to one or more of the high voltage wires being evaluated. In some embodiments, other measurements may be collected to determine an initial conductor temperature, as further described below at step 402. Electric current, battery temperature, electric propulsion unit temperature, coolant temperature, and/or coolant flow rate may be measured. For example, a current sensor may collect an initial current through high voltage wiring configured to power an electric propulsion unit. Temperature sensors coupled to the battery pack, electric propulsion unit, and/or coolant lines may determine the temperatures of these respective components. Flow rate sensor(s) or pressure sensor(s) coupled to a coolant line may determine a coolant flow rate.

At step 402 a conductor core temperature of the high voltage wiring (e.g., HV wiring to an electric propulsion unit) may be estimated. In some embodiments, an initial conductor temperature may be determined using a thermal resistance model based on the resistance and dimensions of the conductor(s), proximity between conductors, conductor jacketing, changes to the ambient air temperature, and/or the current running through the conductor. For example, a thermal resistance model similar to resistance model 402a may be used and an initial conductor core temperature may be calculated.

$$T_i^{n+1} = T_i^n + \frac{\Delta t}{C_i}\left[P_i^{n+1} - \sum_{j=1}^{N} \frac{T_i^{n+1} - T_j^{n+1}}{R_{i-j}}\right]$$

$T_i^{n+1}$=conductor temperature at a current time step (e.g., an initial core temperature), $(T_i^{n+1}-T_j^{n+1})$=change in temperature across the node (e.g., core, jacket, ambient), $T_i^n$=conductor temperature at a previous time step, $\Delta t$=change in time, $C_i$=thermal mass, $R_{i-j}$=thermal resistance values of conduction, convection, and/or radiation, $P_i$=ohmic heat generated by the conductor (as a function of current and electrical resistance). In some embodiments, temperature at a previous time step $T_i^n$ may be approximated (e.g., based on historical information, ambient temperature etc.).

In some embodiments, an initial conductor temperature may be approximated based on an average current draw and/or an average conductor temperature during a typical flight of the aircraft. In some embodiments, experimental data or simulations may be used to establish algorithm(s), model(s), or lookup table(s) that determine an initial conductor temperature based on one or more influencing parameters, such as a measured battery temperature, ambient air temperature, engine temperature, coolant temperature, coolant flow rate, time since last flight(s), and/or details on last flight(s) (e.g., power draw(s) of the electric propulsion units during the flight, flight phases undergone during the flight, duration of the flight, and/or distance of the flight).

After solving for the initial conductor temperature, the temperature of the conductor at subsequent points in time may be determined (e.g., estimated). For example, the conductor temperature may be determined by a time transient model that considers (e.g., is based on and/or configured to receive as inputs, such as constraints) the material of the conductor(s) and jacketing, spacing between conductors, dimensions of the conductor(s) and jacketing, and spacing between components. For example, a time transient model may be employed to estimate the conductor temperatures based on (e.g., using determinations or estimations of) at least one of heat generated by the current, heat dissipated through conduction, heat dissipated through convection, or heat dissipated through radiation to the surrounding environment. In some embodiments, subsequent temperatures of the conductor may be determined using resistance model 402a described above, while in other embodiments subsequent temperatures of the conductor may be determined using the below model:

$$T_{n+1} = T_n + \frac{dt}{D_c c_{p,c}}\left[\frac{I_n^2}{\pi^2 r_c^4}\rho_{c,r}(1+\alpha_c(T_n - T_r)) - h_{conv}\frac{2r_s}{r_c^2}(T_s - T_c) - \sigma\epsilon_s\frac{2r_s}{r_c^2}(T_{s,n}^4 - T_c^4)\right] \quad (18)$$

$T_{n+1}$=conductor temperature at current time step, $T_n$=initial conductor temperature and then temperature at previous time step, dt=time step, $D_c$=conductor diameter, $c_{p,c}$=thermal conductance, $I_n$=current, $r_c$=conductor radius, $\rho_{c,r}$=conductor density, α=conductor thermal diffusivity, $r_s$=radius of surface, $T_s$=temperature of the surface of the conductor (e.g., outer jacket surface), e=thermal emissivity, $T_e$=temperature of the environment (e.g., ambient wing temperature).

The conductor temperature may be iteratively calculated at different times (e.g., using discrete time intervals) where the calculated value of $T_{n+1}$ becomes $T_n$ for the next time step. In some embodiments, the rate of calculation may be set based on experimental data and/or modeling. In some embodiments, the rate of calculation may automatically adjust based on an increase in conductor core temperature. In some embodiments, the conductor temperature may be calculated by integrating a corresponding equation solving for dT/dt to calculate a conductor temperature at different time steps. In some embodiments, changes to thermal environment temperature $T_e$ (e.g., ambient wing temperature) may be measured using one or more sensors mounted within the aircraft wing, and the above models may be updated accordingly.

At step 403, the conductor core temperature is compared to one or more temperature limits and/or ranges. In some embodiments, a normal loading temperature limit may indicate a safe temperature range. For example, a safe temperature range may indicate a temperature range in which there is limited or no risk of damaging the high voltage wiring. Based on a result of the comparing (i.e., one or more comparisons), model 400 may take additional actions. For example, if a determination is made that the conductor temperature is within a normal loading temperature limit, then subsequent steps will not be taken and the conductor temperature will continue to be monitored. An overload temperature may indicate an undesirable temperature range due to its proximity to a conductor thermal design limit. For example, in some embodiments, an overload temperature limit may indicate a temperature range at which control of the aircraft is adjusted and/or warnings are provided to avoid reaching the design limit. A design limit may indicate a temperature where the conductor risks damage to itself and/or surrounding components (e.g., melting, catching fire etc.). In some embodiments, a design limit may be based on a limit established by a manufacturer of the conductor. In some embodiments, upon reaching a design limit, a warning may be issued to a flight control interface and/or a battery state may be de-rated to zero (or a lowest set value). Additionally or alternatively, a temperature limit may include a total amount of current (e.g., passing through a wire) during an amount of time (e.g., an integral of current). Additionally or alternatively, a temperature limit may include or be represented by a function, a model, a range (as discussed above, for example) and/or a curve, such as the exemplary curve depicted in FIG. 4C.

At Step 404a, a remaining time until a limit is reached may be determined. For example, a time until a design limit and/or overload limit is reached may be determined based on the conductor temperature determined at step 402. In some embodiments, the time until a limit is reached may be determined based on one or more model(s), function(s), and/or lookup table(s) that consider (e.g., are based on and/or configured to receive as inputs, such as constraints) the physical properties of the conductor and the conductor temperature. As shown in FIG. 4b, the time until a limit is reached may be determined in consideration of a temperature curve based on (e.g., reflective of) the conductor's physical properties. For example, the time until a limit is reached may be determined based on an I^2t curve that considers the wire construction, material, and conductor cross-sectional area (and/or a curve proportional to the I^2t curve). Therefore, different temperature limits and proximity to the respective temperature limit may be determined for different battery packs. Further, as illustrated in FIG. 4c, in some embodiments, the curve may vary based on an ambient temperature of the wing. For example, as shown, a time until a limit is reached may be longer for a lower wing ambient temperature (e.g., 50 deg. C.) and shorter for a higher wing ambient temperature (e.g., 90 deg. C.). The curve reflective of the conductors' properties may be used in any of the control processes outlined in FIGS. 4a and 4e-4d to determine a time until a limit is reached. As shown in FIG. 4b, the curve line denotes a limit (e.g., overload limit and/or design limit) and shows that when current draw through the high voltage wiring is at a first current value (line 1) lower than a second current value (line 2), the conductor will take a longer time to reach the limit.

In some embodiments, the one or more model(s), function(s), and/or lookup table(s) may operate (e.g., generate one or more predictions) using variations in upcoming current draw (e.g., predicted variations, expected variations based on a flight phase and/or flight plan). As shown in FIG. 4b, the current draw may vary based on an aircraft's state of operation (e.g., flight phase or emergency condition). At a first flight phase (line 3), the current draw may increase leading to a shorter time until a limit is reached, whereas at a second flight phase (line 4) the current draw may decrease leading to a longer time until a limit is reached. As described above, in some embodiments, the flight phase may be determined based on information from vehicle sensing 307. In some embodiments, the flight phase may be determined by comparing position of an aircraft (e.g., through GPS measurements in vehicle sensing 307) with pre-stored navigation information indicating flight phase information for different sections of the trip. As shown below with respect to FIGS. 5A-5D, the current draw may vary greatly depending on the phase of flight. The variation in current draw may be based on (e.g., determined by) simulation data and/or experimental data (e.g., using current sensors during flight). In some embodiments, model 400 may determine a limit (e.g., at step 403) and/or a proximity to a limit (e.g., at step 404a) based on one or more upcoming flight phases (e.g., based on analyzing at least one upcoming flight phase or otherwise using at least one upcoming flight phase, such as an input variable or constraint).

In some embodiments, one or more model(s), function(s), and/or lookup table(s) may provide (e.g., store, determine, predict, and/or calculate) a time until a limit is reached based on the conductor temperature determined at step 402, one or more values used to determine conductor temperature, conductor current drawn, one or more existing flight phases, and/or one or more upcoming flight phases. In some embodiments, analyzing one or more upcoming flight phases may include aggregating a temperature impact to the conductor for flying at each flight phase for an expected duration.

At Step 405, a battery state of the aircraft may be determined. For example, a battery pack state may include a state of power, state of charge, state of health, state of energy, and/or any other battery state of each battery pack. At least one battery states may be determined based on one or more sensor measurements (e.g., from vehicle sensing 307 and/or HV sensing 301). Additionally or alternatively, at least one battery state may be determined by a BMU. In some embodiments, a state of power of the battery pack may be determined. A state of power may indicate an available power that can be provided by the battery pack over a time horizon e.g., without exceeding at least one system constraint (such as battery pack voltage constraint, battery cell temperature constraint, HV wiring current carrying constraint, etc.). State of power may be expressed as an absolute number (e.g., kW, W) or as a ratio or percentage relative to a maximum rated power (e.g., a maximum rated system power). In some embodiments, multiple states of power may be determined for different time horizons and each may be de-rated (as described below with respect to 404b). In some embodiments, state of power may be determined using a state of charge (e.g., based on an initial state of charge and current consumption) and a state of health (e.g., based on an overall condition of the battery pack). In some embodiments, a state of power may be determined for different time intervals based on state of charge, state of health, and/or additional electrical conditions (e.g., measured and/or expected current or voltage). For example, a lookup table or model could retrieve and/or calculate (e.g., using a function or algorithm) a state of power for one or more time intervals based on a state of charge, state of health, and/or additional electrical conditions. In some embodiments, a state of power may be determined using an electro-thermal model that details how a battery pack may change (e.g., temperature changes) based on current and voltage. In some embodiments, a state of power may be determined using a neural network which is trained based on a variety of inputs (e.g., SOC, SOH, voltage, current etc.).

At Step 404b, based on the time until a limit is reached, the battery state may be adjusted (e.g., de-rated). For example, the battery state may be reduced as the time until a limit (e.g., overload temp. limit or design limit) decreases. In some embodiments, the battery state de-rating may follow a linear model. In some embodiments, the battery state de-rating may follow a non-linear model (e.g., a sinusoidal model). In some embodiments, the de-rated battery pack state may be sent to the flight control system (e.g., FCS 320). In some embodiments, other information indicative of a proximity to a limit may be sent to FCS 320 (e.g., the time until a limit is reached and/or another indication of proximity to the limit).

At Step 406, the flight control system (e.g., control commands 304 and/or control allocation 305) may receive the de-rated battery state (and/or another indication of the proximity until the design limit is reached) and control the electric propulsion units based on the de-rated battery state. For example, FCS 320 may store and/or receive an indication of which electric propulsion units are powered by which battery packs and control the electric propulsion units based on the state of its associated battery packs (e.g., battery packs providing power and/or backup power to the EPU). For example, FCS 320 may determine to reduce power demand (e.g., decrease a power demand limit) for components connected to a de-rated battery pack (e.g., relative to power demand for components connected to other buses and/or relative to an initial power demand allowed, prior to de-rating, for the battery pack with the de-rated state). In some embodiments, the flight control system 320 may determine that an electric propulsion unit is receiving power from a back-up battery pack based on information from a battery management system (e.g., an indication from BMU 321 that a battery pack fuse is blown or power is no longer provided by the battery pack). For example, the flight control system 320 may determine which additional electric propulsion units are being powered by a battery pack in an emergency condition based on a received and/or stored relationship between battery packs, electric propulsion units, and cross-links.

In some embodiments, the de-rated battery state may be provided as the state of the battery pack. As detailed above, control allocation 305 may receive commands to achieve an aircraft state (e.g., moment commands, thrust commands etc.) and determine a torque and/or thrust command for the electric propulsion units to achieve the commanded aircraft state while also meeting certain hard (e.g., aircraft stability and/or controllability) and/or soft constraints. In some embodiments, control allocation 305 may determine multiple solutions to achieve a commanded state and may prioritize solutions that better meet the constraints. In some embodiments, a solution may be determined based on a priority scheme for electric propulsion units (e.g., a scheme that prioritizes EPUs based on their position with respect to a wing and/or fuselage of the aircraft and/or their relative control authority). For example, reliance weights may be assigned to different electric propulsion units (EPUs) and these weights may be adjusted based on the de-rated battery state associated with one or more EPU. For example, a reliance weight for an electric propulsion unit may be adjusted based on a battery pack state of power and the weight may decrease (e.g., proportionally) based on a state of power decreasing as a result of de-rating. Therefore, a reliance on the first electric propulsion unit may be reduced in comparison to a second electric propulsion unit as the proximity of the HV wiring to associated with the first EPU to a temperature limit increases. For example, a command to a first electric propulsion unit (e.g., power or torque command) may be adjusted so that a thrust provided by the first electric propulsion unit is reduced relative to a second electric propulsion unit as the proximity of the HV wiring associated with the first EPU to a temperature limit increases. As detailed above, the flight control system may manage power draw of a plurality of electric propulsion units (e.g., each electric propulsion unit of the aircraft) to prevent each electric propulsion unit from exceeding the temperature limit based on the determined proximity, while maintaining stability of the aircraft In some embodiments, the flight control system may receive a battery state that is not de-rated in addition to the de-rated battery state. Therefore, in an emergency condition, the flight control system 320 may be configured to rely on (e.g., use) the non de-rated battery states as opposed to the de-rated battery pack states (override the de-rated battery pack states) if the risk of the high voltage wiring overheating is less than the risk of reducing usage of the associated electric propulsion unit(s). The flight control system may store one or more flight conditions where non-de-rated battery pack states (e.g., state of power) should be used. For example, in some embodiments, non-de-rated battery pack states (e.g., state of power) may be used for EPU control if the power required to maintain the control or stability of the aircraft exceeds that provided by the de-rated battery pack(s) or if the aircraft is performing an emergency landing. In some embodiments, upon the flight control system 320 determining an emergency condition, a non-derated battery state will be relied on. For example, the flight control system 320 may determine an emergency condition based on one or more electric propulsion units failing, one or more battery packs failing (e.g., short circuit, overcurrent condition, battery cell failure, battery pack depletion), control surface(s) failing, tilt propeller system(s) failing, and/or another failure of a critical system.

In some embodiments, determining the proximity to a temperature limit (step 404a) and the corresponding battery state de-rating and control adjustments (steps 404b and 406) are performed on a continuous basis as the aircraft is in flight based on at least one of changes to the wing ambient temperature, changes to conductor core temperature, changes to current through the HV wiring, and/or changes to state(s) of aircraft operation (e.g., flight phases or emergency condition). In some embodiments, these steps are iteratively performed at a preset interval of time.

Figure 4D:
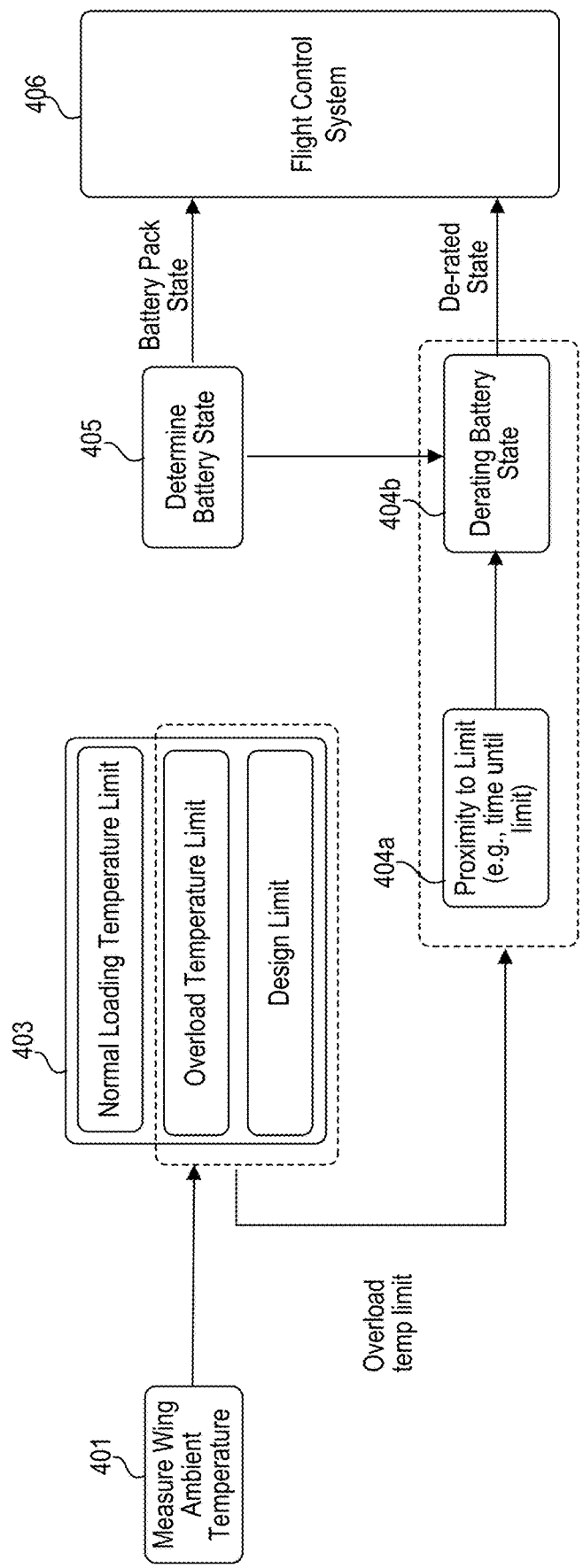

FIG. 4d illustrates a model for controlling the aircraft to avoid overheating high voltage wiring, consistent with disclosed embodiments. In some embodiments, in addition to or in lieu of using the models described above with respect to FIG. 4a steps 401 and 402, empirical data may be used to correlate an ambient wing temperature and current to a proximity to a temperature limit. For example, simulations and/or experimental data may be employed to determine a relationship between ambient wing temperature, current, and time until a limit is reached. In some embodiments, this relationship may further include an impact of flight phase. The relationship information may be stored as one or more model(s), function(s), and/or lookup table(s) that retrieves a time until a design limit is reached based on the ambient wing temperature and the current measurement. The remaining steps are described above with respect to FIG. 4a.

Figure 4E:
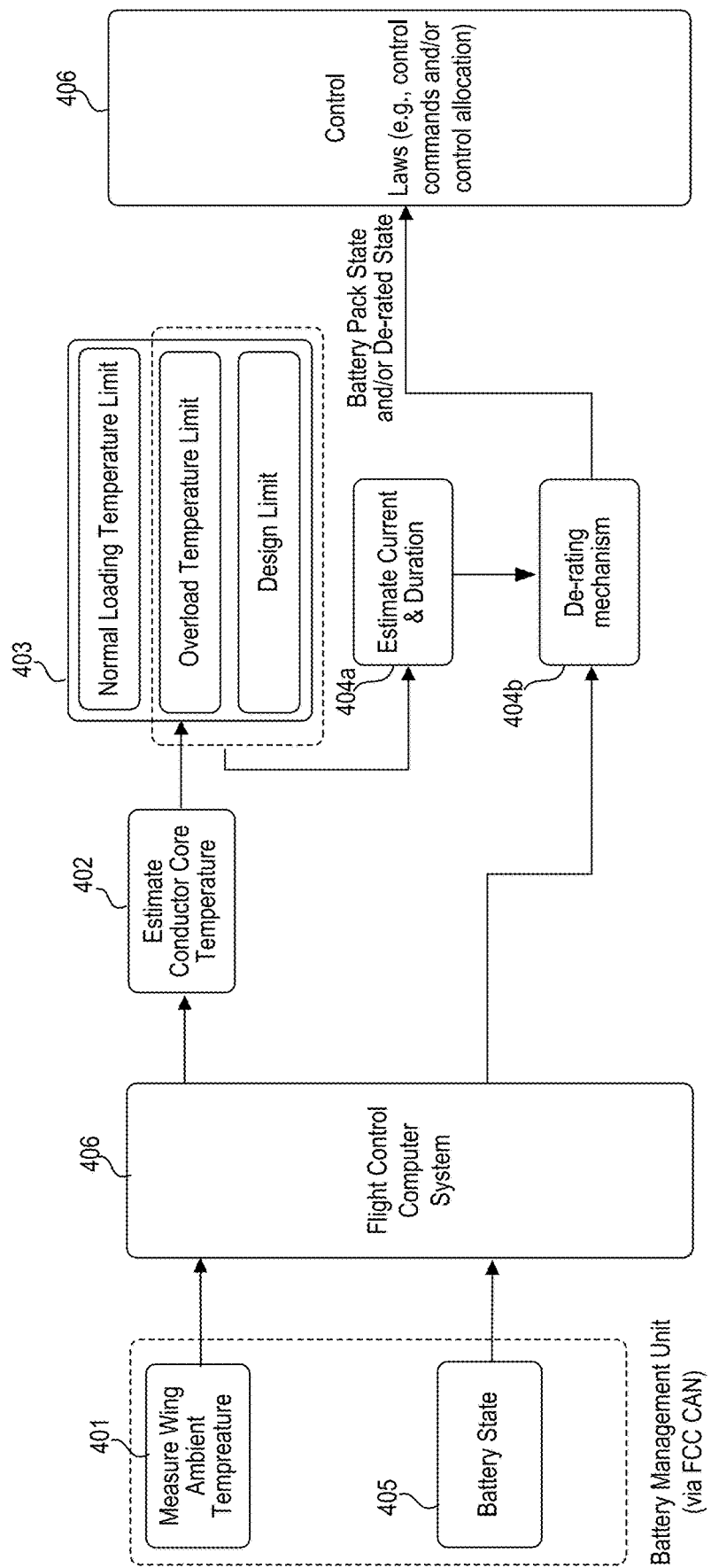

FIG. 4e illustrates another model for controlling the aircraft to avoid overheating high voltage wiring, consistent with disclosed embodiments. As described above, in some embodiments, one or more steps of determining a proximity to a high voltage wiring temperature limit may be performed by the flight control system (FCS) 320. As shown, in some embodiments, BMU 310 provides the measured wing ambient temperature, the battery state, and the high voltage wiring current draw to the flight control system. The flight control system may determine a time until a limit is reached and de-rate the battery pack state as described above. In some embodiments, the time until a limit is reached is based on one or more models used to estimate the conductor temperature, as described above with respect to FIG. 4a. In other embodiments, a time until a limit is reached is based on empirical data which establishes a relationship between the wing ambient temperature, current, and time until a limit is reached, as described above with respect to FIG. 4b.

In some embodiments, the process shown in FIGS. 4a and 4d-e may be based on a temperature measurement of the high voltage wiring (e.g., a temperature sensor connected to the high voltage wiring) and the proximity to the temperature limit may be based on this measurement in addition to or in lieu of the methods described above for determining high voltage wiring temperature (e.g., modeling based on wing ambient temperature etc.). For example, a temperature measurement may be from a temperature sensor connected to high voltage wiring feeding electric engines and/or wiring feeding battery packs (e.g., cross link 130). In some embodiments, a measured temperature of the high voltage wiring may be combined with the methods described above to determine a proximity to a temperature limit. For example, the measured temperature may be averaged with the modeled temperature described above with respect to FIG. 4a step 402.

In some embodiments, the processes shown in FIGS. 4a and 4d-e may be performed continuously and control adjusted based on determined (e.g., measured, estimated, computed) values, consistent with disclosed embodiments. In some embodiments, the processes may be performed every set interval of time.

FIGS. 5A-5D illustrate how current draw and a corresponding time until a temperature limit is reached may vary based on flight phase of the aircraft. The impacts of existing and/or upcoming flight phases (e.g., impacts to a current draw, temperature limit, and/or time until a temperature limit is reached) may be included in one or more models, functions, and/or lookup tables used to determine a proximity to a temperature limit (e.g., a time until a temperature limit is reached), consistent with disclosed embodiments. While the graphs in FIGS. 5A-5D are shown with particular scales of current, time, and temperature, it is appreciated that these scales are only exemplary, and that values of current and/or temperature may change differently over time in different scenarios (though the trend depicted may remain the same or similar).

Figure 5A:
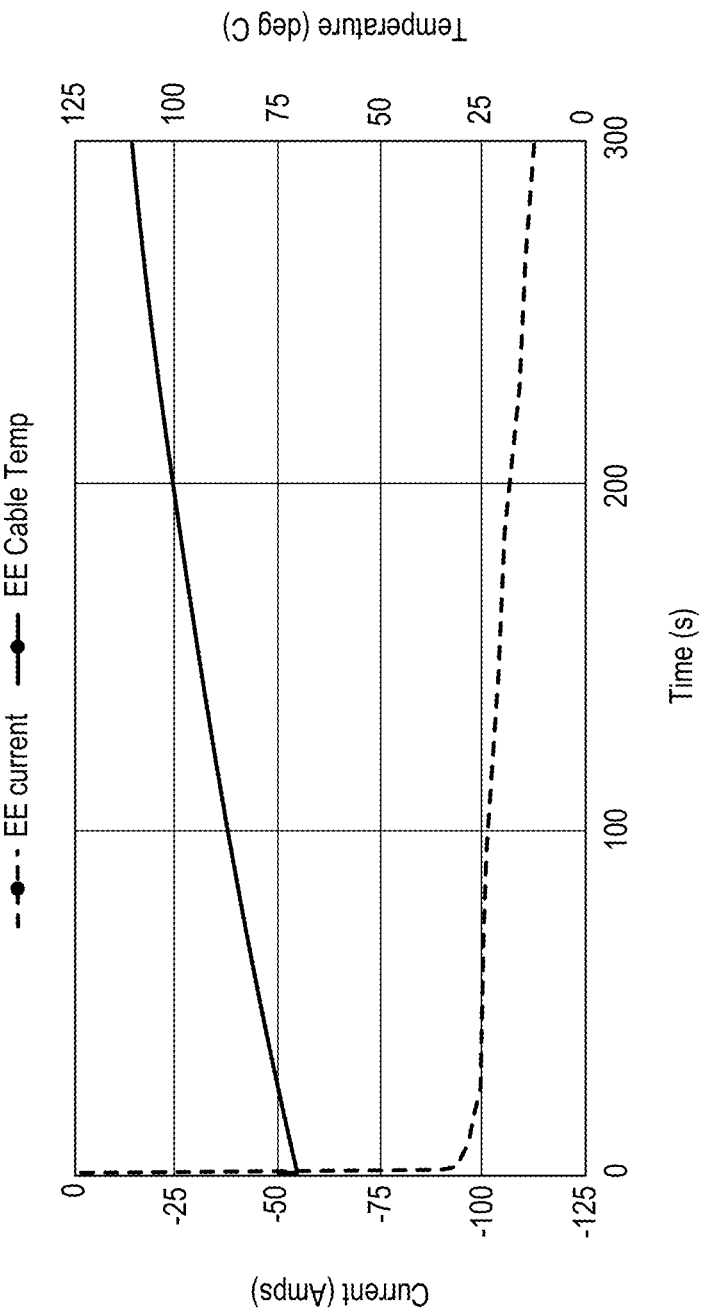

FIG. 5A illustrates an example of current draw during a takeoff phase of the aircraft (e.g., a vertical takeoff). As shown, the current draw through the high voltage wiring is larger than the current draw in other phases (e.g., forward flight shown below). Accordingly, the high voltage wiring temperature increases more quickly. Further, the current draw and corresponding high voltage wiring temperature increases during a takeoff phase of the aircraft. Therefore, in takeoff, the determined time until a temperature limit is reached (e.g., determined as discussed above with respect to one or more of FIG. 4A, 4D, or 4E) may be less than another flight phase based on the high starting current and expected increase in current draw.

Figure 5B:
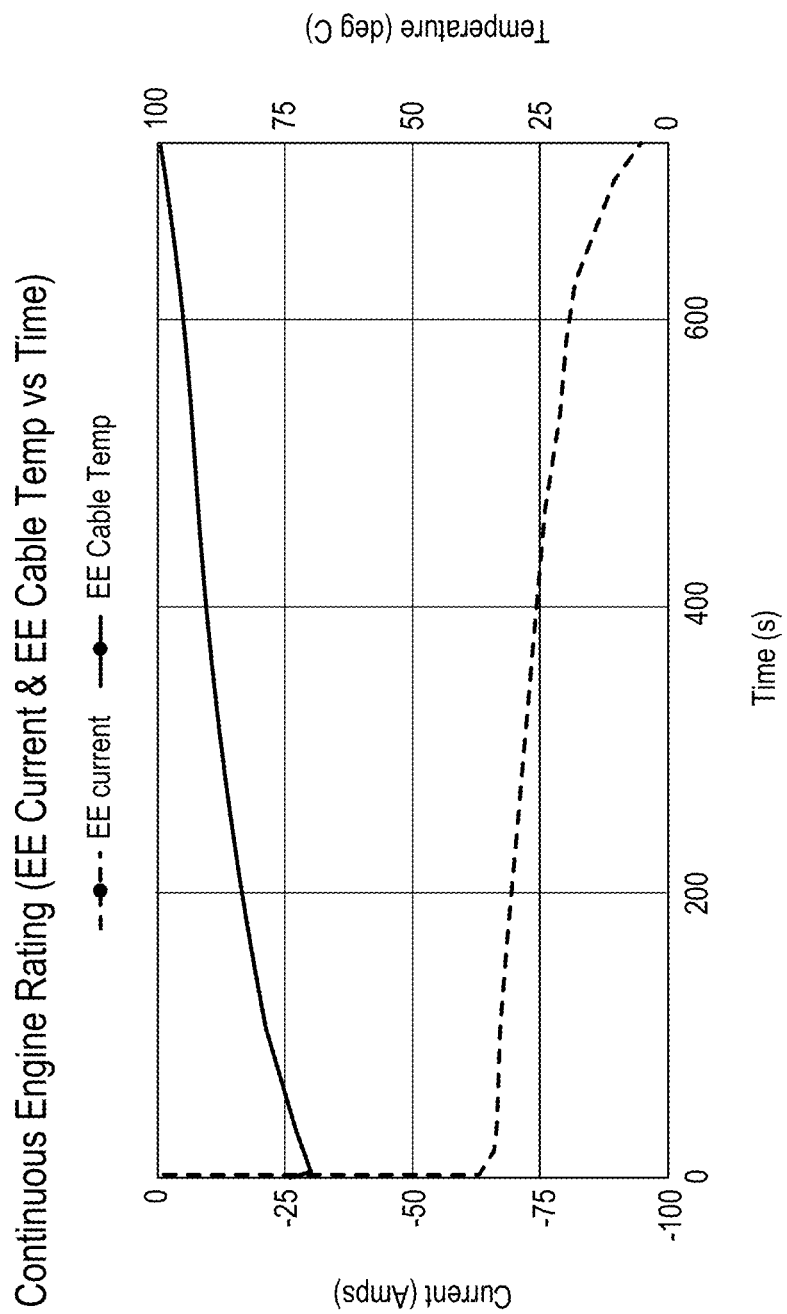

FIG. 5B illustrates an example of current draw during a forward flight phase. As shown, the current draw through the high voltage wiring is lower than other flight phases (e.g., takeoff or hover). Further, the current draw increases as a constant power draw is maintained. The corresponding high voltage temperature of the wiring may increase more slowly than in another flight phase (e.g., hover and/or takeoff). Therefore, the determined time until a temperature limit is reached when the aircraft transitions to forward flight may be greater than another flight phase (e.g., hover and/or takeoff).

Figure 5C:
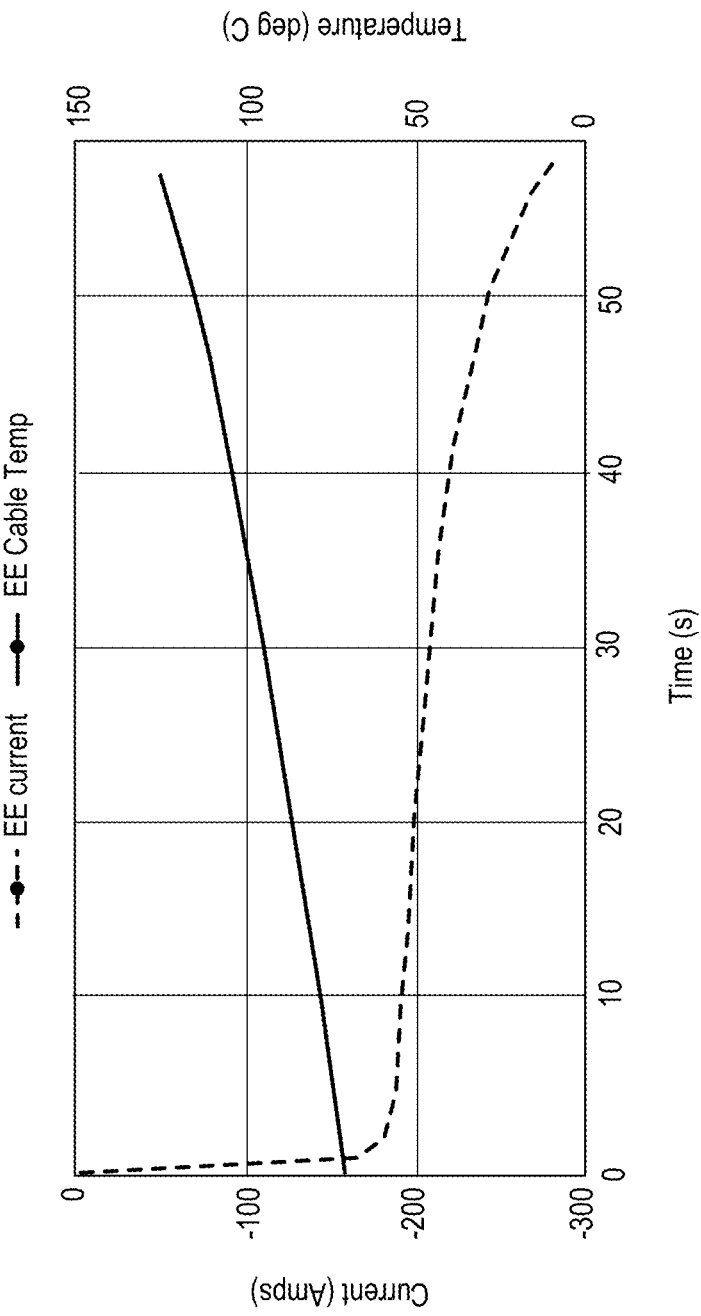

FIG. 5C illustrates an example of current draw during an emergency condition of the aircraft. An emergency condition may include a situation where a battery pack is providing backup power to one or more additional electric propulsion units. For example, the current draw of FIG. 5c may illustrate how current varies during an emergency experienced in a hover phase of flight, such as when performing a vertical landing. As shown, the current draw through the high voltage wiring is larger than the current draw in other phases (e.g., forward flight and/or takeoff shown above). Accordingly, the high voltage wiring temperature increases more quickly. Further, the current draw and corresponding high voltage wiring temperature increases. Therefore, the determined time until a temperature limit is reached when the aircraft is in an emergency condition may be less than another flight phase (e.g., forward flight and/or takeoff shown above).

Figure 5D:
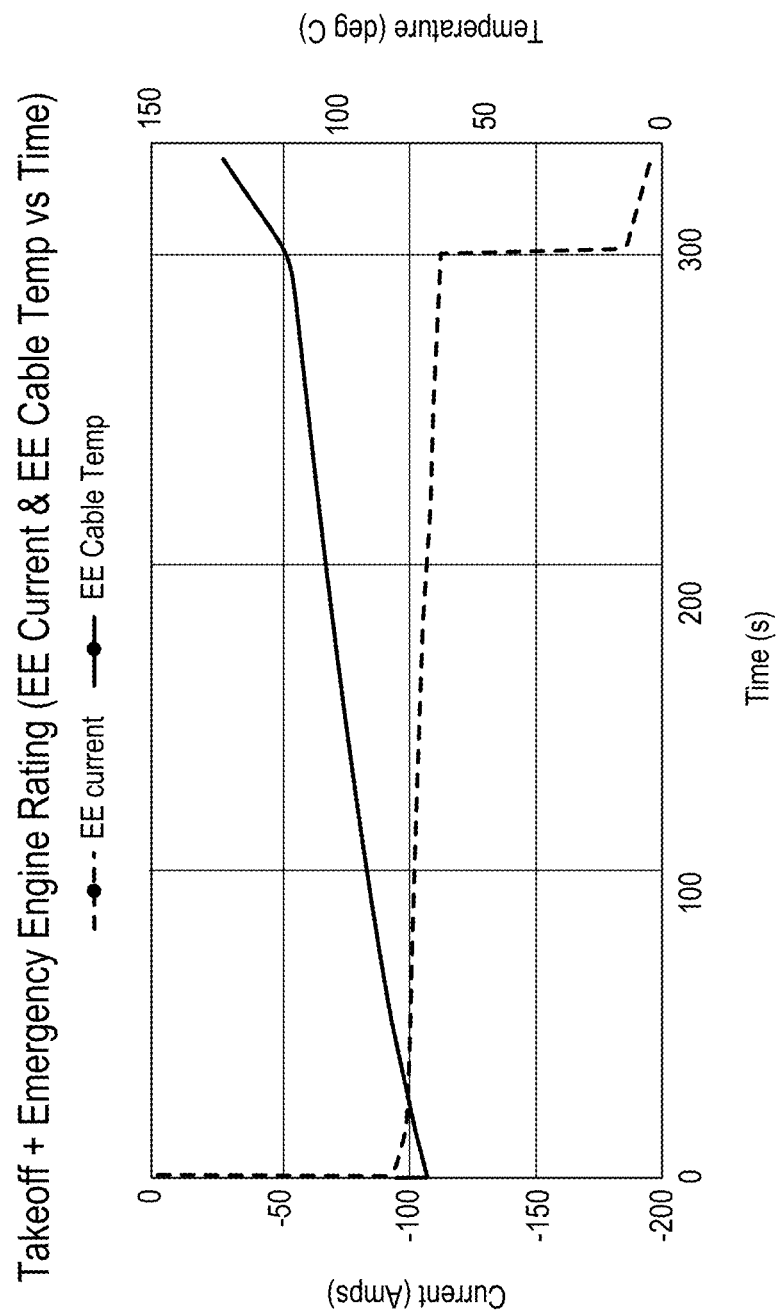

FIG. 5D illustrates an example of current draw during takeoff, followed by an emergency condition of the aircraft. As described above, in some embodiments, one or more upcoming flight phases and/or aircraft states may be considered when determining a time until a temperature limit is reached. For example, determining a time until a temperature limit is reached (a proximity to the temperature limit) comprises considering an impact of the at least two upcoming flight phases on the high voltage wiring temperature (e.g., predicted increase due to, predicted decrease due to). FIG. 5D illustrates a scenario where the aircraft is in takeoff and then experiences an emergency condition around 300 seconds. For example, the emergency condition may include a situation where a battery pack is providing power to one or more additional electric propulsion units. Once the emergency condition begins, the current draw and corresponding high voltage wiring temperature increases. Therefore, the determined time until a temperature limit is reached may be less if one of the predicted upcoming aircraft states includes an emergency condition.

FIG. 6 illustrates a display indicating a status of the aircraft components, which may be displayed on a screen in an aircraft (e.g., in a cockpit), consistent with disclosed embodiments. In some embodiments, the FCS 320 may adjust the display based on information received from the BMU 310 and/or other component(s) of the aircraft. In some embodiments, a state of one or more aircraft components may be displayed (e.g., on a display screen 601 associated with the FCS 320). In some embodiments, the state of the aircraft component may indicate temperature associated with the aircraft component. For example, a battery pack temperature (BT) may indicate a temperature of one or more battery pack components and/or a temperature of the associated high voltage wiring. In some embodiments, the highest temperature of the one or more battery pack components and high voltage wiring may be displayed (e.g. on display screen temperature portion 602). An oil temperature (OT) may indicate a temperature of oil used in an electric propulsion unit of the aircraft. A stator winding temperature (ST) may indicate a temperature of an electric propulsion unit's stator winding.

In some embodiments, the proximity of the one or more aircraft components to a respective thermal limit (e.g., temperature limit) may be displayed. For example, an oil temperature (OT), stator winding temperature (SWT), and/or battery temperature (BT) may be shown relative to one or more limits (shown by different hatching at the top of the meter). In some embodiments, the aircraft component that is closest to their respective temperature limit may be selected (e.g., by BMU 310 and/or FCS 320) for display and their proximity to the temperature limit may be displayed. For example, only one of an oil temperature (OT), stator winding temperature (SWT), battery temperature (BT), or temperature of another aircraft component may be selected to include on the display 602 based on its proximity to a respective thermal limit (e.g., a temperature limit).

In some embodiments, the display may include an estimated or predicted future state of one or more aircraft components (e.g., future temperature). For example, as shown in the expanded display of 602, a trend line 603 may indicate an expected temperature of a component within a set time interval.

In some embodiments, additional details on the aircraft component may be displayed (e.g., on a separate display panel and/or separate selectable interface). For example, details on which battery pack component and respective battery pack is closest to a thermal limit may be provided. For example, a layout of the aircraft components and subcomponents may be visually displayed (e.g., as a schematic drawing) and the components closest to a respective thermal limit may be indicated (e.g., through shading or text).

In some embodiments, the display may indicate one or more control actions being automatically performed to avoid overheating of an aircraft component (e.g., an adjustment to EPUs and/or an emergency landing). In some embodiments, the display may recommend one or more control actions for the pilot to take to avoid overheating of an aircraft component. For example, the display may recommend a pilot land at an alternate destination, perform a certain type of landing (e.g., conventional vs. hover), and/or allocate a certain amount of time for cooling of one or more aircraft components before the next flight. The display may dynamically and/or continually update, such as based on repeated determinations made by at least one process or model, such as those described herein with respect to FIGS. 4A, 4D, and 4E.

Additional aspects of the present disclosure may be further described via the following clauses:

1. A method of controlling an aircraft, comprising:
   receiving first sensor data indicating at least one attribute of high voltage wiring of the aircraft;
   receiving a state of operation of the aircraft;
   determining a proximity of a temperature of the high voltage wiring to a temperature limit based on the first sensor data and the state of operation of the aircraft; and
   controlling at least one electric propulsion unit of the aircraft to avoid exceeding the temperature limit based on the determined proximity.
2. The method of clause 1, wherein the at least one attribute comprises at least one of: a temperature of the high voltage wiring, a wing ambient temperature, or a current through the high voltage wiring.
3. The method of clause 1 or 2, wherein the at least one attribute comprises a temperature of high voltage wiring received from a temperature sensor on the high voltage wiring, and wherein the high voltage wiring is configured to provide power to at least one of: an electric propulsion unit or a battery pack.
4. The method of any of clauses 1-3, wherein the at least one attribute comprises a wing ambient temperature and a current through the high voltage wiring.
5. The method of any of clauses 1-4, wherein the state of operation comprises at least one of a flight phase or an emergency condition status.
6. The method of any of clauses 1-5, wherein the state of operation comprises an emergency condition status indicating whether a battery back is providing backup power.
7. The method of any of clauses 1-6, wherein the state of operation comprises a flight phase comprising at least one of: hover, takeoff, or forward flight.
8. The method of any of clauses 1-7, wherein the state of operation is based on at least one of: airspeed measurements, altitude measurements, ground speed measurements, propeller tilt angle measurements, or GPS measurements.
9. The method of any of clauses 1-8,
   wherein the state of operation comprises at least two upcoming flight phases; and
   wherein determining the proximity to the temperature limit comprises considering an impact of the at least two upcoming flight phases on the high voltage wiring temperature.
10. The method of any of clauses 1-9, wherein the proximity to the temperature limit is determined based on at least one of a model or a lookup table.
11. The method of any of clauses 1-10, wherein the proximity to the temperature limit is based on a proximity to a curve proportional to (current of the high voltage wiring)^2*(a temperature of the high voltage wiring).
12. The method of any of clauses 1-11, wherein the proximity to the temperature limit is determined based on a model or lookup table, and wherein inputs to the model or lookup table comprise: a temperature of the high voltage wiring, a current through the high voltage wiring, and a flight phase of the aircraft.
13. The method of any of clauses 1-12, wherein the proximity to the temperature limit is a time until the high voltage wiring temperature reaches the temperature limit.
14. The method of any of clauses 1-13, wherein determining the proximity to the temperature limit and controlling at least one electric propulsion unit of the aircraft to avoid exceeding the temperature limit is performed more than once while the aircraft is in flight.
15. The method of any of clauses 1-14, wherein controlling at least one electric propulsion unit of the aircraft to avoid exceeding the temperature limit comprises controlling a plurality of electric propulsion units according to a priority scheme.
16. The method of any of clauses 1-15,
   wherein the high voltage wiring is configured to provide power to a first electric propulsion unit; and
   wherein controlling at least one electric propulsion unit of the aircraft to avoid exceeding the temperature limit comprises reducing a thrust provided by the first electric propulsion unit in comparison to a second electric propulsion unit as the determined proximity to the temperature limit increases.
17. The method of any of clauses 1-16, wherein controlling at least one electric propulsion unit of the aircraft to avoid exceeding the temperature limit comprises de-rating a battery state of a battery pack associated with the high voltage wiring and controlling the at least one electric propulsion unit based on the de-rated battery state.
18. The method of clause 17, wherein the de-rated battery state is a de-rated state of power of the battery pack associated with the high voltage wiring.
19. The method of any of clauses 1-18,
   wherein receiving first sensor data comprises receiving first sensor data for each of a plurality of high voltage wiring sections associated with a plurality of battery packs;
   wherein determining the proximity to the temperature limit comprises determining a proximity of each high voltage wiring section to a respective temperature limit; and
   wherein controlling at least one electric propulsion unit of the aircraft to avoid exceeding the temperature limit comprises:
      adjusting a battery state of each of the plurality of battery packs based on the proximity of its respective high voltage wiring section to the respective temperature limit, and allocating power across a plurality of electric propulsion units based on the adjusted battery pack states.

20. The method of clause 19, further comprising: wherein each of the plurality of high voltage wiring sections comprises high voltage wiring feeding an electric propulsion unit.

21. The method of any of clauses 1-20, wherein controlling the at least one electric propulsion unit of the aircraft comprises managing the power draw of the at least one electric propulsion unit to prevent the electric propulsion unit from exceeding the temperature limit based on the determined proximity.

22. The method of any of clauses 1-21, wherein controlling the at least one electric propulsion unit of the aircraft to avoid exceeding the temperature limit comprises managing the power draw of each of a plurality of electric propulsion units of the aircraft to prevent each electric propulsion unit from exceeding the temperature limit based on the determined proximity, while maintaining stability of the aircraft.

23. A system for controlling an aircraft comprising at least one processor configured to execute instructions to cause the system to perform any of clauses 1-22.

24. A computer-readable storage medium storing instructions which, when executed by at least one processor, cause the at least one processor to perform the method of any of clauses 1-22.

26. An aircraft comprising:
a first sensor;
at least one electric propulsion unit;
high voltage wiring;
at least one processor configured to execute instructions to cause the system to perform any of the clauses 1-22.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the inventions disclosed herein.

The features and advantages of the disclosure are apparent from the detailed specification, and thus, it is intended that the appended clauses cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. As used herein, unless specifically stated otherwise, being "based on" may include being dependent on, being interdependent with, being derived from (e.g., using), being associated with, being defined at least in part by, being influenced by, or being responsive to. As used herein, "related to" or "relating to" may include being inclusive of, being expressed by, being indicated by, or being based on. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent to those skilled in the art from consideration of the specification and practice of the implementations disclosed herein. It is intended that the architectures and circuit arrangements shown in figures are only for illustrative purposes and are not intended to be limited to the specific arrangements and circuit arrangements as described and shown in the figures. It is also intended that the specification and examples be considered as exemplary only, with the true scope and spirit of the invention being indicated by the following clauses. The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the inventions disclosed herein. It is also intended that the sequence of steps shown in figures is only for illustrative purposes and is not intended to be limited to any particular sequence of steps. As such, those skilled in the art can appreciate that these steps can be performed in a different order while implementing the same method.

The invention claimed is:

1. A method of controlling an aircraft, comprising:
receiving, during flight, first sensor data indicating at least one attribute of high voltage wiring of the aircraft;
receiving, during flight, a state of operation of the aircraft;
determining, during flight, a proximity of a temperature of the high voltage wiring to a temperature limit based on the first sensor data and the state of operation of the aircraft; and
controlling at least one electric propulsion unit of the aircraft to avoid exceeding the temperature limit based on the determined proximity.

2. The method of claim 1, wherein the at least one attribute comprises at least one of: a temperature of the high voltage wiring, a wing ambient temperature, or a current through the high voltage wiring.

3. The method of claim 1, wherein the at least one attribute comprises a temperature of high voltage wiring received from a temperature sensor on the high voltage wiring, and wherein the high voltage wiring is configured to provide power to at least one of: an electric propulsion unit or a battery pack.

4. The method of claim 1, wherein the at least one attribute comprises a wing ambient temperature and a current through the high voltage wiring.

5. The method of claim 1, wherein the state of operation comprises at least one of a flight phase or an emergency condition status.

6. The method of claim 5, wherein the state of operation comprises an emergency condition status indicating whether a battery back is providing backup power.

7. The method of claim 1, wherein the state of operation comprises a flight phase comprising at least one of: hover, takeoff, or forward flight.

8. The method of claim 1, wherein the state of operation is based on at least one of: airspeed measurements, altitude measurements, ground speed measurements, propeller tilt angle measurements, or GPS measurements.

9. The method of claim 1,
wherein the state of operation comprises at least two upcoming flight phases; and
wherein determining the proximity to the temperature limit comprises considering an impact of the at least two upcoming flight phases on the high voltage wiring temperature.

10. The method of claim 1, wherein the proximity to the temperature limit is determined based on at least one of a model or a lookup table.

11. The method of claim 1, wherein the proximity to the temperature limit is based on a proximity to a curve proportional to (current of the high voltage wiring)^2*(a temperature of the high voltage wiring).

12. The method of claim 1, wherein the proximity to the temperature limit is determined based on a model or lookup table, and wherein inputs to the model or lookup table comprise: a temperature of the high voltage wiring, a current through the high voltage wiring, and a flight phase of the aircraft.

13. The method of claim 1, wherein the proximity to the temperature limit is a time until the high voltage wiring temperature reaches the temperature limit.

14. The method of claim 1, wherein determining the proximity to the temperature limit and controlling at least one electric propulsion unit of the aircraft to avoid exceeding the temperature limit is performed more than once while the aircraft is in flight.

15. The method of claim 1, wherein controlling at least one electric propulsion unit of the aircraft to avoid exceeding the temperature limit comprises controlling a plurality of electric propulsion units according to a priority scheme.

16. The method of claim 1,
wherein the high voltage wiring is configured to provide power to a first electric propulsion unit; and
wherein controlling at least one electric propulsion unit of the aircraft to avoid exceeding the temperature limit comprises reducing a thrust provided by the first electric propulsion unit in comparison to a second electric propulsion unit as the determined proximity to the temperature limit increases.

17. The method of claim 1, wherein controlling at least one electric propulsion unit of the aircraft to avoid exceeding the temperature limit comprises de-rating a battery state of a battery pack associated with the high voltage wiring and controlling the at least one electric propulsion unit based on the de-rated battery state.

18. The method of claim 17, wherein the de-rated battery state is a de-rated state of power of the battery pack associated with the high voltage wiring.

19. The method of claim 1,
wherein receiving first sensor data comprises receiving first sensor data for each of a plurality of high voltage wiring sections associated with a plurality of battery packs;
wherein determining the proximity to the temperature limit comprises determining a proximity of each high voltage wiring section to a respective temperature limit; and
wherein controlling at least one electric propulsion unit of the aircraft to avoid exceeding the temperature limit comprises:
adjusting a battery pack state of each of the plurality of battery packs based on the proximity of its respective high voltage wiring section to the respective temperature limit, and
allocating power across a plurality of electric propulsion units based on the adjusted battery pack states.

20. The method of claim 19, further comprising: wherein each of the plurality of high voltage wiring sections comprises high voltage wiring feeding an electric propulsion unit.

21. The method of claim 1, wherein controlling the at least one electric propulsion unit of the aircraft comprises managing the power draw of the at least one electric propulsion unit to prevent the electric propulsion unit from exceeding the temperature limit based on the determined proximity.

22. The method of claim 1, wherein controlling the at least one electric propulsion unit of the aircraft to avoid exceeding the temperature limit comprises managing the power draw of each of a plurality of electric propulsion units of the aircraft to prevent each electric propulsion unit from exceeding the temperature limit based on the determined proximity, while maintaining stability of the aircraft.

23. A system for controlling an aircraft comprising at least one processor configured to execute instructions to cause the system to:
receive, during flight, first sensor data indicating at least one attribute of high voltage wiring of the aircraft;
receive, during flight, a state of operation of the aircraft;
determine, during flight, a proximity of a temperature of the high voltage wiring to a temperature limit based on the first sensor data and the state of operation of the aircraft; and
control at least one electric propulsion unit of the aircraft to avoid exceeding the temperature limit based on the determined proximity.

24. A computer-readable storage medium storing instructions which, when executed by at least one processor, cause the at least one processor to:
receive, during flight, first sensor data indicating at least one attribute of high voltage wiring of an aircraft;
receive, during flight, a state of operation of the aircraft;
determine, during flight, a proximity of a temperature of the high voltage wiring to a temperature limit based on the first sensor data and the state of operation of the aircraft; and
control at least one electric propulsion unit of the aircraft to avoid exceeding the temperature limit based on the determined proximity.

25. An aircraft comprising:
a first sensor;
at least one electric propulsion unit;
high voltage wiring;
at least one processor configured to execute instructions to:
receive, during flight, sensor data from the first sensor indicating at least one attribute of the high voltage wiring;
receive, during flight, a state of operation of the aircraft;
determine, during flight, a proximity of a temperature of the high voltage wiring to a temperature limit based on the first sensor data and the state of operation of the aircraft; and
control the at least one electric propulsion unit of the aircraft to avoid exceeding the temperature limit based on the determined proximity.

* * * * *